United States Patent
Nakao

(10) Patent No.: US 7,917,670 B2
(45) Date of Patent: Mar. 29, 2011

(54) INFORMATION PROCESSING APPARATUS AND METHOD OF CONTROLLING INFORMATION PROCESSING APPARATUS

(75) Inventor: Takehisa Nakao, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 148 days.

(21) Appl. No.: 12/473,891

(22) Filed: May 28, 2009

(65) Prior Publication Data

US 2009/0300228 A1 Dec. 3, 2009

(30) Foreign Application Priority Data

May 29, 2008 (JP) .................... 2008-140932

(51) Int. Cl.
  *G06F 3/00* (2006.01)
(52) U.S. Cl. ............... 710/36; 726/26; 726/27; 726/28; 326/8
(58) Field of Classification Search .................. None
See application file for complete search history.

(56) References Cited

U.S. PATENT DOCUMENTS

| | | |
|---|---|---|
| 2005/0160068 A1 | 7/2005 | Sakaguchi |
| 2006/0077424 A1 * | 4/2006 | Maruta et al. ............... 358/1.15 |
| 2006/0209337 A1 | 9/2006 | Atobe et al. |
| 2008/0144105 A1 * | 6/2008 | Yagi ............................ 358/1.16 |
| 2008/0281837 A1 * | 11/2008 | Sawayanagi et al. ......... 707/100 |
| 2008/0304660 A1 * | 12/2008 | Sawayanagi et al. ........... 380/44 |

FOREIGN PATENT DOCUMENTS

| | | |
|---|---|---|
| JP | 2001-154918 | 6/2001 |
| JP | 2001-319195 | 11/2001 |
| JP | 2005-193411 | 7/2005 |
| JP | 2006-229854 | 8/2006 |
| JP | 2006-302257 | 11/2006 |

OTHER PUBLICATIONS

Araki, Shigeo, "The Memory Stick", 2000, IEEE, pp. 1-7.*
Japanese Office Action mailed Apr. 27, 2010, directed to counterpart Japanese Application No. 2008-140932; 4 pages.

* cited by examiner

*Primary Examiner* — Eron J Sorrell
(74) *Attorney, Agent, or Firm* — Morrison & Foerster LLP

(57) ABSTRACT

It is determined whether or not logout is executed after login. If a user authentication process is executed and a user authentication processing state is ended, it is determined whether or not a USB device is attached. If a USB device is attached, then it is determined whether or not there exists job execution history of the USB device. If there exists job execution history of the USB device, that is, if job execution history for the USB device exists in a job history management table, the attachment of the USB device having the job execution history is released.

14 Claims, 15 Drawing Sheets

FIG.5

| USB DEVICE | ATTACHMENT STATE | ATTACHING TIME |
|---|---|---|
| USB MEMORY (CN1) | BEING ATTACHED | 8:50 |
| USB MEMORY (CN2) | NOT ATTACHED | — |
| ⋮ | BEING ATTACHED | 9:00 |
| USB MEMORY (CN5) | BEING ATTACHED | 7:00 |
| USB MEMORY (CN6) | BEING ATTACHED | 8:00 |

FIG.6

| PROCESS TARGET | JOB PROCESS | STATUS | PROCESS TIME |
|---|---|---|---|
| USB MEMORY (CN1) | DATA WRITING PROCESS | COMPLETED | 9:58 |
| USB MEMORY (CN1) | DATA DELETING PROCESS | COMPLETED | 10:00 |
| USB MEMORY (CN3) | DATA PRINTING PROCESS | COMPLETED | 10:02 |
| USB MEMORY (CN4) | DATA PRINTING PROCESS | CANCEL | 10:10 |
| USB MEMORY (CN5) | DATA PRINTING PROCESS | ERROR PROCESS | 10:15 |

FIG.7

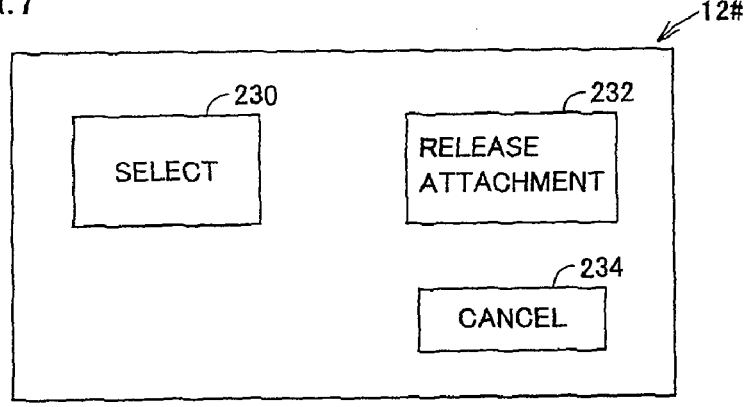

FIG.16

| OPERATION TARGET | OPERATION PROCESS | OPERATION TIME |
|---|---|---|
| USB MEMORY (CN1) | USB DEVICE SELECTING PROCESS | 12:02 |
| USB MEMORY (CN1) | USB DEVICE SELECTING PROCESS COMPLETED | 12:04 |
| USB MEMORY (CN3) | USB DEVICE SELECTING PROCESS | 12:08 |
| USB MEMORY (CN3) | FILE SELECTING PROCESS | 12:10 |
| USB MEMORY (CN3) | FILE DATA READING PROCESS | 12:12 |
| USB MEMORY (CN3) | PRINTING PROCESS | 12:14 |

INFORMATION PROCESSING APPARATUS AND METHOD OF CONTROLLING INFORMATION PROCESSING APPARATUS

This application is based on Japanese Patent Application No. 2008-140932 filed with the Japan Patent Office on May 29, 2008, the entire content of which is hereby incorporated by reference.

BACKGROUND OF THE INVENTION

1. Field of the Invention

The present invention relates to an information processing apparatus and a method of controlling an information processing apparatus, and more particularly to an image formation apparatus having a USB connector to which a USB (Universal Serial Bus) device can be attached.

2. Description of the Related Art

In recent years, with the widespread use of USB memories, more and more users save document data and the like into USB memories and always carry the USB memories with them.

In order to cope with such a case, recently, it is necessary to connect a USB memory to an MFP (Multi Function Peripheral) to print a document stored in the USB memory or to store a scanned document in the USB memory.

Japanese Laid-Open Patent Publication Nos. 2006-229854, 2006-302257, and 2001-319195 propose methods of permitting using a USB memory when data such as authentication information held in the USB memory matches, in terms of ensuring the security of data.

Storing data such as authentication information in a USB memory to determine whether use is permitted or not may, however, result in a complicated system, which is inconvenient.

By contrast, a simple scheme may be employed, in which, for example, in a case where the attached USB memory is used by performing a personal authentication process, that is, login, all the USB memories attached to the MFP are released from attachment at a time of logout and allowed to be removed.

In this manner, the USB memory is released from attachment at a time of logout, and therefore even if the USB memory fails to be pulled out, it is possible to prevent the other person from erroneously accessing the USB memory that fails to be pulled out.

There is no problem in a case where all the USB memories that are released from attachment at a time of logout belong to the person who executes a personal authentication process. However, MFP is generally shared among a plurality of users, and it is quite possible that the other person's USB memory is attached. In such a case, the USB memory that is irrelevant to the concerned person is also released from attachment, and thus when the other person uses the USB memory, he/she has to perform a cumbersome operation of pulling out the USB memory once from the USB connector and attaching it again.

SUMMARY OF THE INVENTION

The present invention is made to solve the aforementioned problem, and an object of the present invention is to provide an information processing apparatus and a method of controlling an information processing apparatus in which safety and convenience of a USB device can be improved for the user by appropriately releasing a USB device attached to a USB connector, at a time of logout.

An information processing apparatus in accordance with an aspect of the present invention includes: a plurality of connectors to each of which a removable storage device can be attached; a connection management unit for setting an electrically connected/not-connected state between the attached removable storage device and a corresponding connector among the plurality of connectors; a control unit for executing a job process for the attached removable storage device set in the electrically connected state with the corresponding connector; a history management unit for managing history information of the job process executed for the attached removable storage device set in the electrically connected state with the corresponding connector; and an authentication unit for executing a personal authentication process. When the personal authentication process in the authentication unit is ended, the connection management unit sets the electrically connected state between the attached removable storage device and the corresponding connector to the not-connected state, based on whether or not there exists history information of the job process executed for the attached removable storage device set in the electrically connected state with the corresponding connector as managed by the history management unit.

Preferably, the information processing apparatus further includes a state management unit for managing information of the connected state of the attached removable storage device among the plurality of connectors. When the personal authentication process in the authentication unit is ended, the connection management unit sets the electrically connected state between the attached removable storage device and the corresponding connector to the not-connected state, if there exists history information of the job process executed for the attached removable storage device set in the electrically connected state with the corresponding connector as managed by the history management unit, and if it is determined that a removable storage device is attached after the personal authentication process is executed, based on the information of the connected state of the attached removable storage device as managed by the state management unit.

Preferably, when the personal authentication process in the authentication unit is ended, if there exists history information of the job process executed for the attached removable storage device set in the electrically connected state with the corresponding connector as managed by the history management unit, the connection management unit determines whether or not a prescribed condition is satisfied based on content of the history information and sets the electrically connected state between the attached removable storage device and the corresponding connector to the not-connected state based on a result of the determination.

Particularly, the connection management unit determines, as the prescribed condition, whether or not history of a job process executed by a user's operating error is included in the history information.

Particularly, the connection management unit determines, as the prescribed condition, whether or not history of executing a data writing process of saving data and thereafter executing a data deleting process of deleting the saved data is included in the history information.

Particularly, the connection management unit determines, as the prescribed condition, whether or not history of starting execution of a data writing process of saving data and thereafter canceling the data writing process is included in the history information.

Particularly, the information processing apparatus further includes a printing unit for executing a printing process of printing data. The connection management unit determines, as the prescribed condition, whether or not history of starting execution of a printing process of printing data and thereafter canceling the printing process is included in the history information.

Particularly, canceling the printing process includes cancelling the printing process based on a user's operation and cancelling the printing process based on a malfunction of the printing unit. The connection management unit determines, as the prescribed condition, whether or not history of starting execution of a printing process of printing data and thereafter cancelling the printing process based on the user's operation is included in the history information.

An information processing apparatus in accordance with another aspect of the present invention includes: a plurality of connectors to each of which a removable storage device can be attached; a connection management unit for setting an electrically connected/not-connected state between the attached removable storage device and a corresponding connector among the plurality of connectors; a control unit for executing a job process according to a prescribed operation process for the attached removable storage device set in the electrically connected state with the corresponding connector; an operation history management unit for managing history information of a user's operation process executed for the attached removable storage device set in the electrically connected state with the corresponding connector; and an authentication unit for executing a personal authentication process. When the personal authentication process in the authentication unit is ended, the connection management unit sets the electrically connected state between the attached removable storage device and the corresponding connector to the not-connected state, based on whether or not there exists history information of the user's operation process executed for the attached removable storage device set in the electrically connected state with the corresponding connector as managed by the operation history management unit.

Preferably, when the personal authentication process in the authentication unit is ended, if there exists history information of the user's operation process executed for the attached removable storage device set in the electrically connected state with the corresponding connector as managed by the operation history management unit, the connection management unit determines whether or not a prescribed condition is satisfied based on content of the history information of the user's operation process and sets the electrically connected state between the attached removable storage device and the corresponding connector to the not-connected state based on a result of the determination.

Particularly, the connection management unit determines, as the prescribed condition, whether or not history only having an operation process of selecting the attached removable storage device and an operation process of ending selecting the attached removable storage device is included in the history information of the user's operation process.

Particularly, the connection management unit determines, as the prescribed condition, whether or not history having, as an operation procedure, an operation process of selecting the attached removable storage device, an operation process of ending selecting the attached removable storage device, an operation process of selecting another attached removable storage device, an operation process of selecting a file stored in another removable storage device, and an operation process of reading data from the selected file is included in the history information of the user's operation process.

In accordance with an aspect of the present invention, provided is a method of controlling an information processing apparatus provided with a plurality of connectors to each of which a removable storage device can be attached. The method includes the steps of: setting an electrically connected state between the attached removable storage device and a corresponding connector among the plurality of connectors; executing a job process for the attached removable storage device set in the electrically connected state with the corresponding connector; managing history information of the job process executed for the attached removable storage device set in the electrically connected state with the corresponding connector; determining whether or not a personal authentication process is ended after the personal authentication process is executed; and when it is determined that the personal authentication process is ended, setting the electrically connected state between the attached removable storage device and the corresponding connector to a not-connected state, based on whether or not there exists history information of the job process executed for the attached removable storage device set in the electrically connected state with the corresponding connector.

In accordance with another aspect of the present invention, provided is a method of controlling an information processing apparatus provided with a plurality of connectors to each of which a removable storage device can be attached. The method includes the steps of: setting an electrically connected state between the attached removable storage device and a corresponding connector among the plurality of connectors; executing a job process according to a prescribed operation process for the attached removable storage device set in the electrically connected state with the corresponding connector; managing history information of a user's operation process executed for the attached removable storage device set in the electrically connected state with the corresponding connector; determining whether or not a personal authentication process is ended after the personal authentication process is executed; and when it is determined that the personal authentication process is ended, setting the electrically connected state between the attached removable storage device and the corresponding connector to a not-connected state, based on whether or not there exists history information of the user's operation process executed for the attached removable storage device set in the electrically connected state with the corresponding connector.

In the information processing apparatus and the information processing method in accordance with the present invention, when the personal authentication processing state is ended, a removable storage device having history found by referring to the history management table is set to the not-connected state. Through this process, for the USB devices attached to USB connectors, it is possible to automatically release attachment only for the USB device for which the user has executed a job and that is likely to be determined to be owned by the user and not to automatically release attachment of the other USB device that is likely to be determined to be irrelevant.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 illustrates a USB device management table.

FIG. 6 illustrates an exemplary job history management table.

FIG. 7 illustrates a transition screen in a case where a USB button in the screen in FIG. 3 is pressed.

FIG. 16 illustrates an operation history management table.

DESCRIPTION OF THE PREFERRED EMBODIMENTS

Figure 1:
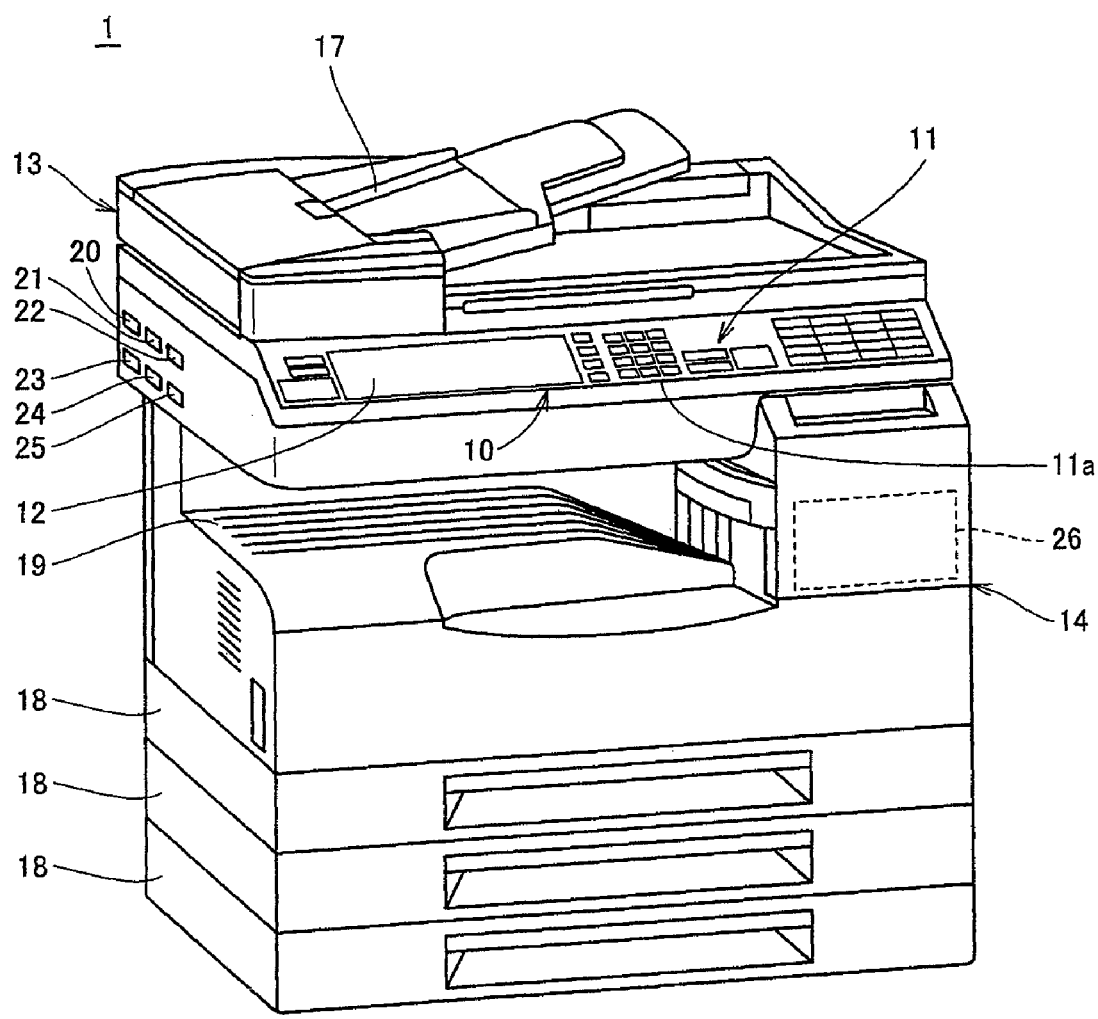
FIG. 1 a perspective view of MFP as an image formation apparatus in accordance with an embodiment of the present invention.

In the following, the embodiments of the present invention will be described with reference to the figures. In the following description, the same parts and components are denoted with the same reference characters. They have the same designations and functions.

Although MFP is taken as an example of image formation apparatus that is a kind of information processing apparatus in the following description, the present invention is not limited to MFP and may be applicable to another apparatus, for example, PC.

First Embodiment

Overall Configuration of MFP

Using FIG. 1, MFP as an image formation apparatus in accordance with an embodiment of the present invention will be described.

Referring to FIG. 1, MFP 1 in accordance with the embodiment of the present invention is a digital multifunction device having a copy function, a scanner function, and the like.

MFP 1 has slots 20-25 as connection means to/from which a plurality (in this embodiment, six) of USB-compliant external devices can be attached/removed. External devices each having a USB interface, for example, USB devices such as USB memories or USB-HDD (Hard Disk Drive) as external storage devices are connected to these slots 20-25 so that the external devices and MFP 1 can communicate data each other. In the following, slots 20-25 are also referred to as USB slots or USB connectors.

MFP 1 includes an operation panel unit 10. Operation panel unit 10 includes a plurality of keys 11a, an operation unit 11 accepting inputs of a variety of instructions and data such as characters and numbers by the user's operations on keys 11a, and an operation display 12 formed of, for example, liquid crystal for displaying instruction menus for the users and information concerning the obtained images.

MFP 1 also includes a scanner unit 13 optically reading an original document to obtain image data and a printer unit 14 printing an image on a recording sheet based on image data.

MFP 1 is further provided with a feeder unit 17 feeding an original document to scanner unit 13 on the top surface of the body thereof, a paper supply unit 18 supplying recording sheets to printer unit 14 on the lower portion thereof, and a tray 19 on the middle portion thereof, to which a recording sheet having an image printed by printer unit 14 is discharged.

A storage unit 26 storing necessary data such as a control program for use in each unit for controlling the main body, image data, etc. is provided in the interior of the body of MFP 1.

Operation display 12 displays a variety of modes and others and executes a variety of settings according to the display contents. Operation unit 11 is used for a variety of inputs by the users. They function as main portions of the user interface.

Scanner unit 13 optoelectronically reads image information such as photographs, characters, and pictures from original documents to obtain image data. The obtained image data (density data) is converted into digital data in an image control unit described later, which is subjected to a variety of well-known image processing, then temporarily stored in a memory 42, and then sent to printer unit 14, a USB device, or the like for printing images or saving data.

Printer unit 14 prints images on recording sheets based on image data obtained by scanner unit 13 or image data stored in a USB device or the like.

Using FIG. 2, the functional blocks of MFP 1 as an image formation apparatus in accordance with the first embodiment of the present invention will be described.

Figure 2:
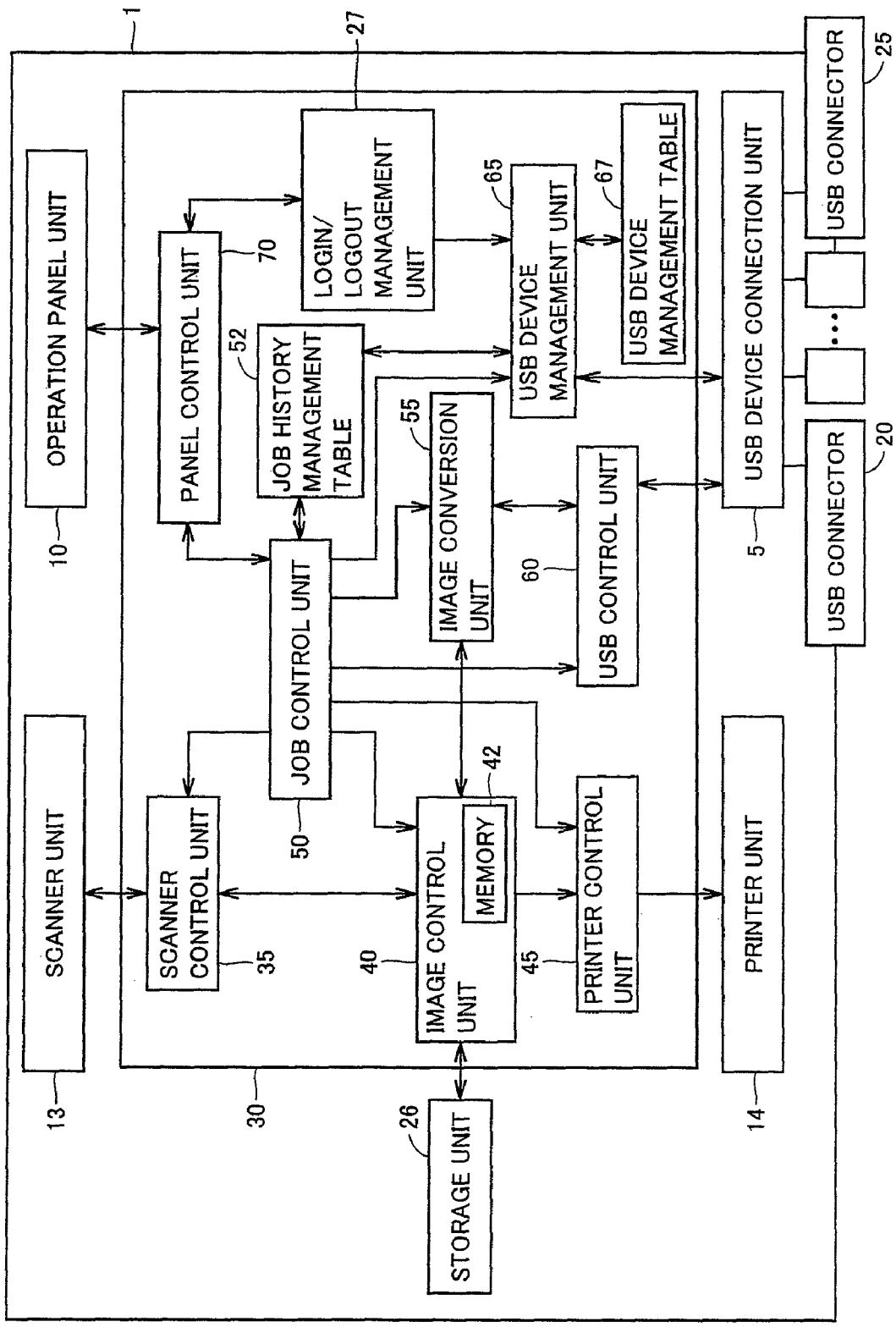
FIG. 2 is a functional block diagram of MFP as an image formation apparatus in accordance with a first embodiment of the present invention.

Referring to FIG. 2, MFP 1 in accordance with the first embodiment of the present invention includes scanner unit 13 converting materials on a paper medium etc. into electronic data, storage unit 26 formed of, for example, a hard disk, printer unit 14 executing a printing process, USB connectors 20-25 to each of which a USB device is attached, a USB device connection unit 5 executing control of connection between USB devices and USB connectors 20-25, operation panel unit 10 including the operation display, and a control unit 30 for controlling the entire MFP.

When a USB device is attached to USB connectors 20-25, USB device connection unit 5 senses the attachment and outputs the sensing information concerning the attached device to a USB device management unit 65. Furthermore, USB device connection unit 5 releases attachment of the USB device attached to USB connectors 20-25 in accordance with an instruction from USB device management unit 65. It is noted that in the present specification to release attachment of a USB device refers to a state in which although a USB device is inserted in USB connectors 20-25, a communication path between the USB device and control unit 30 is cut off In other words, when USB device connection unit 5 is instructed by USB device management unit 65 to release attachment of a USB device, USB device connection unit 5 sets the electrical connection with the USB device of interest that is attached to the USB connector to a not-connected state. On the other hand, when a USB device is newly attached to a USB connector in a state in which nothing is attached to the USB connector, USB device connection unit 5 sets the USB device attached through the USB connector of interest and control unit 30 to an electrically connected state.

Control unit 30 includes a scanner control unit 35 for controlling scanner unit 13 in response to an instruction from a job control unit 50, an image control unit 40 executing image processing, a printer control unit 45 controlling printer unit 14, a USB control unit 60 executing access to a USB device through USB device connection unit 5, a USB device management unit 65 controlling USB device connection unit 5 by managing the attachment state of a USB device and the like, a USB device management table 67 managing the attachment state of a USB device, an image conversion unit 55 converting the format of image data, a panel control unit 70 controlling the display contents to be displayed on operation panel unit 10 and also outputting to job control unit 50 an instruction for an operation unit from operation panel unit 10, job control unit 50 controlling jobs in MFP 1, a job history management table 52 managing a job history state, and a login/logout management unit 27. Here, the control program etc. for executing the function of each unit in control unit 30 is stored in storage unit 26, and the control program stored in storage unit 26 is read to execute a prescribed function.

Image control unit 40 receives an input of image data, which is electronic data resulting from scanning processing in scanner unit 13, through scanner control unit 35 for image processing and then temporarily stores the image data in an internal memory 42 for output to printer control unit 45 or image conversion unit 55 in response to an instruction from job control unit 50. Image control unit 40 also temporarily stores in internal memory 42 image data input from image conversion unit 55 for output to printer control unit 45 in response to an instruction from job control unit 50.

Printer control unit 45 receives an input of image data from image control unit 40 to give a print instruction to printer unit 14. Printer unit 14 executes a printing process on image data of which print instruction is given by printer control unit 45.

Image conversion unit 55 converts image data input from image control unit 40 into a prescribed format for output to USB control unit 60, in response to an instruction from job control unit 50. Alternatively, image conversion unit 55 converts image data input from a USB device through USB control unit 60, into a prescribed format for output to image control unit 40.

USB control unit 60 outputs image data resulting from format conversion by image conversion unit 55 to a USB device (for example, USB memory) through a USB connector under connection control by USB device connection unit 5, in response to an instruction from job control unit 50, and executes a writing process into the USB device (for example, USB memory). USB control unit 60 also executes a reading process of image data from a USB device (for example, USB memory) through a USB connector under connection control by USB device connection unit 5, in response to an instruction from job control unit 50.

USB device management unit 65 receives sensing information concerning the attached USB device (equipment) from USB device connection unit 5 to store into USB device management table 67 the kind and the attachment state as well as the attaching time of the USB device. USB device management unit 65 also refers to USB device management table 67 and job history management table 52 to instruct USB device connection unit 5 to release attachment of the USB device as necessary at the time of the user's logout, as described later.

Panel control unit 70 outputs the display contents to be displayed to the operation display in operation panel unit 10 and also outputs an instruction for an operation input from operation panel unit 10 to job control unit 50. In addition, panel control unit 70 displays a USB icon button to allow a prescribed operation on a USB device to be executed when the user designates the USB icon button, as described later.

Job control unit 50 outputs an operation instruction to each control unit etc. for executing a variety of functions (jobs) of MFP 1 according to an instruction for an operation input from operation panel unit 10 through panel control unit 70. In doing so, job control unit 50 also stores the history of executing a job into job history management table 52.

Login/logout management unit 27 executes a user authentication process according to an operation input in operation panel unit 10 through panel control unit 70 (login). Subsequently, the user is being authenticated, that is, a user authentication processing state begins. Then, the user authentication processing state is ended by a prescribed operation (logout). At the end of the user authentication processing state, login/logout management unit 27 outputs information that logout is set to USB device management unit 65.

Using FIG. 3, the configuration of operation panel unit 10 in MFP 1 in accordance with the embodiment of the present invention will be described.

Figure 3:
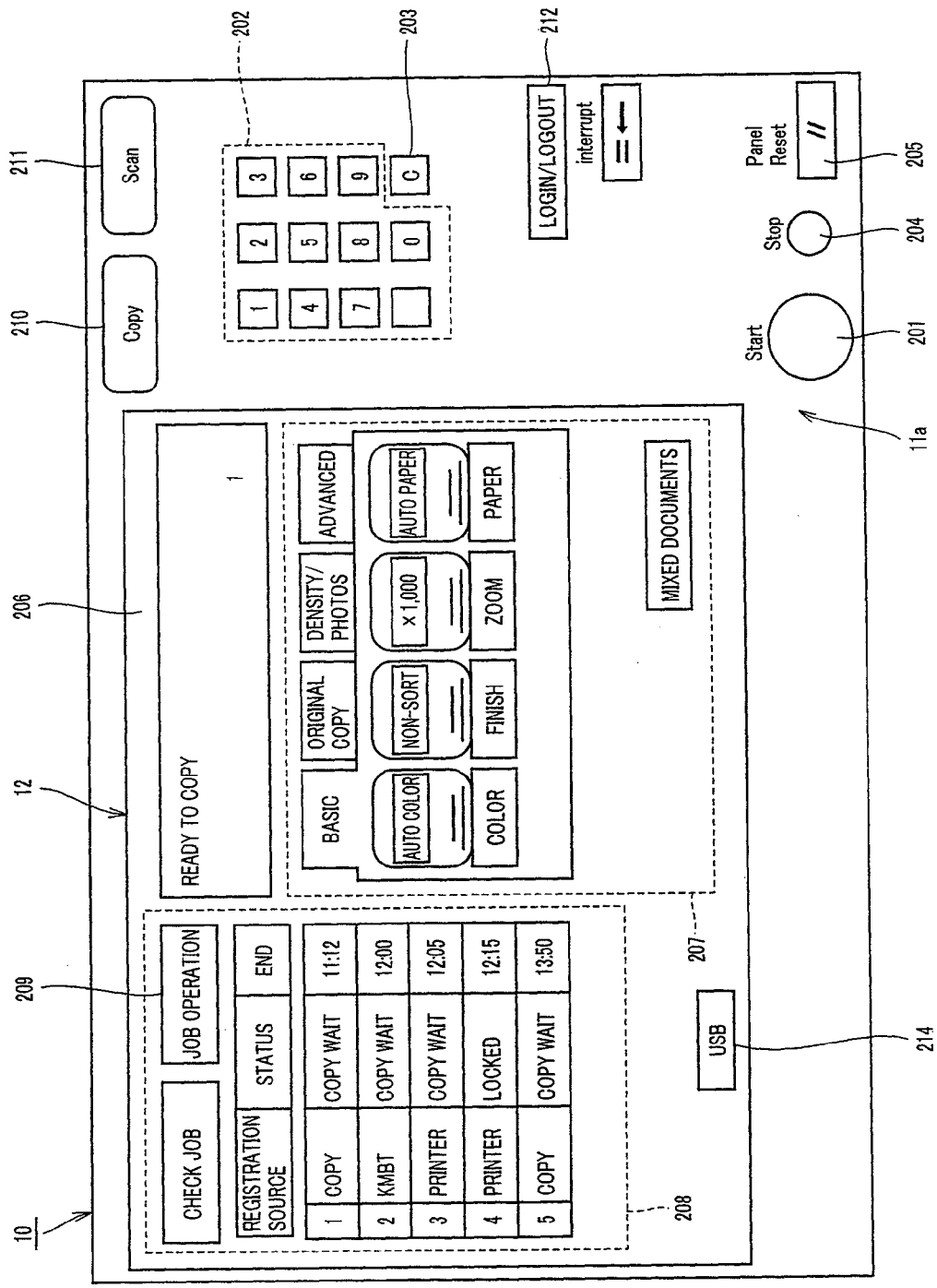
FIG. 3 illustrates a configuration of an operation panel unit in MFP in accordance with the embodiment of the present invention.

Referring to FIG. 3, a Start key 201 is used to start an operation such as copy/scan. A ten-key pad 202 is used to input a numerical value such as the number of copies. A Clear key 203 is used to clear the input numerical value and discard the image data accumulated in the image storage unit.

A Stop key 204 is used to give an instruction to stop a copy/scan operation. A Panel Reset key 205 is used to discard the set mode and jobs. When Stop key 204 is pressed during a process of data writing into a USB device or data printing, the operation of writing data into the USB device or the data printing operation is stopped.

Operation display 12 displays a variety of modes and others and has a touch panel 206 on the surface thereof.

This touch panel 206 allows the user to make a variety of settings according to the display contents in operation display 12. For example, when a setting screen for a user ID that is user identification information appears on operation display 12, the user sets a user ID or the like using the keys of operation unit 11 and a touch button displayed on operation display 12. Then, when MFP 1 is to be operated, for example, a login screen is displayed by pressing login/logout button 212 and a user authentication process is executed in login/logout management unit 27 as described above by inputting the registered user ID, etc (login). Subsequently, the user is being authenticated, that is, the user authentication processing state begins. On the other hand, in the login state, a logout screen is displayed by pressing login/logout button 212 again and the user authentication processing state is ended in login/logout management unit 27 as described above by inputting execution of logout (logout).

In a setting screen region 207 in touch panel 206, buttons are arranged for basic/advanced settings performed when a copy operation or a scan operation is executed. When each button is pressed, a layered screen appears for making the detailed setting.

Information of jobs applied to MFP 1 at that moment is displayed in a job information screen region 208 of touch panel 206. The display is arranged in the order of jobs to be executed. When an operation such as deletion or change is performed on a particular job, job operation button 209 is selected and a job number button for the operation target is then pressed. These operations allow a job operation screen to appear thereby allowing an operation on the particular job.

Copy key 210 and Scan key 211 are select keys for setting in which of a copy mode and a scanner mode MFP 1 is to be operated.

When Copy key 210 is pressed, MFP 1 becomes available as a copy machine. In this state, a scanner operation cannot be executed.

At that time, display for making a variety of settings for the copy operation appears in setting screen region 207 of touch panel 206. After completion of the settings, an original document is set and Start key 201 is pressed thereby starting the copy operation.

On the other hand, when Scan key 211 is pressed, MFP 1 becomes available as a scanner. In this state, a copy operation cannot be executed.

At that time, display for making a variety of settings for the scan operation appears in setting screen region 207 of touch panel 206. At the end of the settings, an original document is set and Start key 201 is pressed thereby starting the scan operation.

It is noted that Copy key 210 and Scan key 211 are exclusive operations, and when one of them is selected, the other is automatically in a not-selected state.

A USB button 214 is also displayed in operation display 12, and a prescribed operation described later can be executed by pressing USB button 214.

Using FIG. 4, the flow of releasing attachment of a USB device in USB device management unit 65 in accordance with the first embodiment of the present invention will be described.

Figure 4:
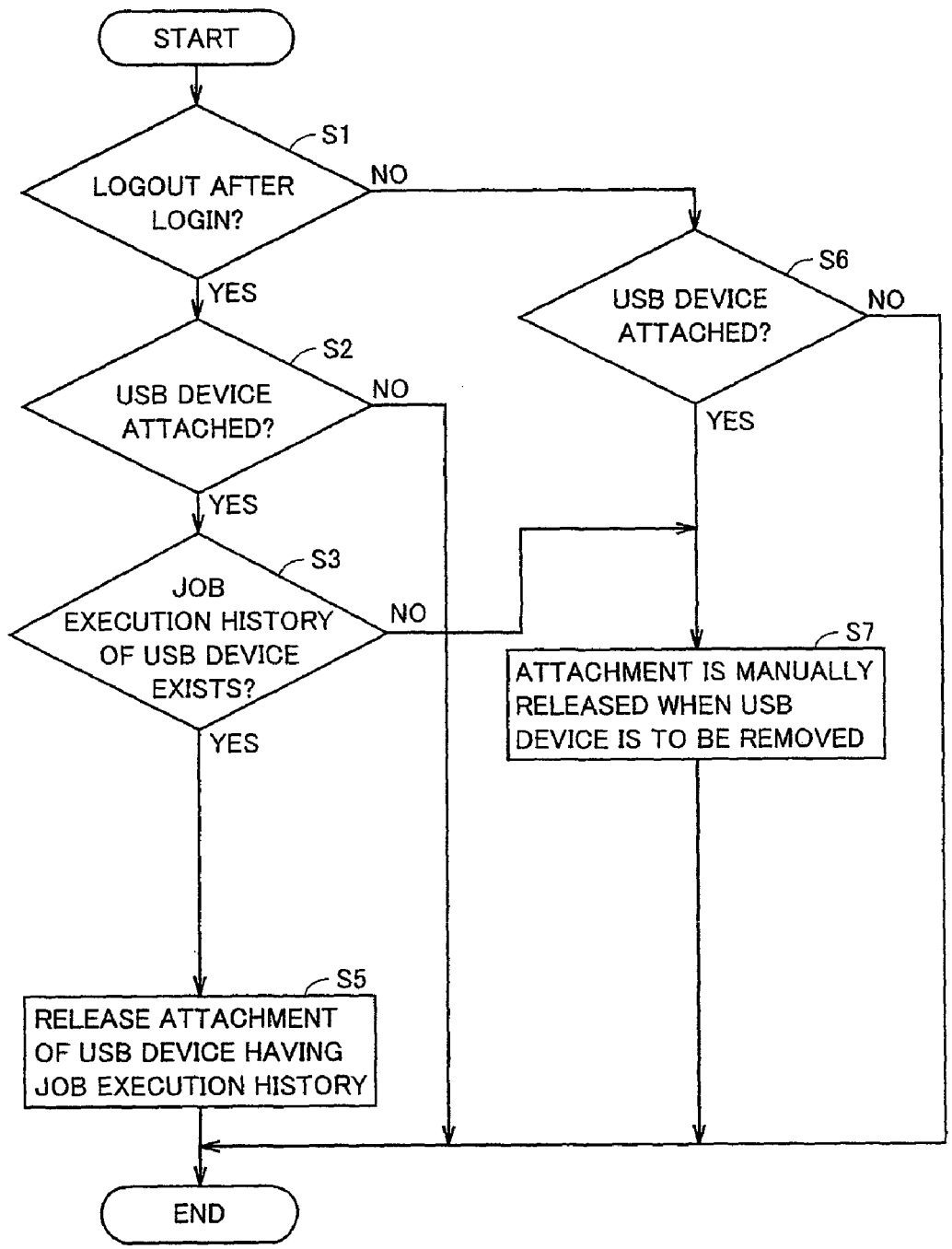
FIG. 4 is a flowchart illustrating a flow of releasing attachment of a USB device in a USB device management unit in accordance with the first embodiment of the present invention.

Referring to FIG. 4, it is determined whether or not logout is executed after login (step S1). More specifically, it is determined whether or not a user authentication process is executed and the authentication processing state is ended. If a user authentication process is executed and the authentication processing state is ended in step S1, the process proceeds to the next step S2. If login and logout are not executed, that is, if a user authentication process is not executed, the process proceeds to step S6.

Specifically, USB device management unit 65 can make a determination depending on whether or not information that logout is set is output from login/logout management unit 27.

If the user authentication process is executed and the authentication processing state is ended in step S2, then it is determined whether or not a USB device is attached. Specifically, the determination can be made depending on whether or not a USB device attached to a USB connector exists in USB device management table 67.

If a USB device attached to a USB connector does not exist in USB device management table 67 in step S2, there is no need for releasing attachment of a USB device and the process therefore ends (END).

On the other hand, if a USB device is attached, that is, if a USB device attached to a USB connector exists in USB device management table 67, in step S2, then it is determined whether job execution history of the USB device exists or not (step S3). Specifically, by referring to job history management table 52, the determination can be made depending on whether a job for the USB device attached to the USB connector has been executed or not.

If there exists job execution history of the USB device, that is, if the job execution history for the USB device exists in job history management table 52, in step S3, the attachment of the USB device having the job execution history is released (step S5).

Through this process, USB device management unit 65 releases attachment of the USB device for which job has actually been executed, among the USB devices attached to the USB connectors, so that an instruction to release the attachment is not output when the USB device for which job has not been executed is attached to the USB connector.

More specifically, it is possible to automatically release attachment of only the USB device for which the user has executed a job and that is likely to be determined to be owned by the user and not to automatically release attachment of the other USB device that is likely to be determined to be irrelevant. Accordingly, the USB device that is likely to be owned by the user is released from attachment after logout, thereby preventing the other users from easily accessing it, and thus improving safety. The USB device that is likely to be owned by the other user is not released from attachment, thereby improving the other user's convenience.

On the other hand, if the user authentication process is not executed in step S1, the process proceeds to step S6, and it is determined whether a USB device is attached or not (step S6).

If a USB device is attached in step S6, then the attachment is manually released when the USB device is to be removed (step S7). If a USB device is not attached in step S6, the process ends (END).

If the job execution history of the USB device does not exist, that is, if the execution history of the job for the USB device does not exist in job history management table 52, in step S3, the process proceeds to step S7 without releasing the attachment of the USB device, because it is likely that, for example, the USB device that is owned by the other user has been attached since before login. In other words, the attachment is manually released when the USB device is to be removed (step S7).

Using FIG. 5, the USB device management table will be described.

Referring to FIG. 5, here, it is shown as an example that USB device management unit 65 receives equipment information concerning the equipment of the USB device from USB device connection unit 5 to store information of the equipment kind, the attachment state, and the attaching time of the device into USB device management table 67.

Specifically, for example, connector numbers CN1-CN6 are provided respectively corresponding to USB connectors 20-25, and the kind, the attachment state, and the attaching time of the USB device are stored corresponding to each connector number. It is shown by way of example that a USB memory is attached to USB connector 20 having connector number CN1 and the attaching time is "8:50." On the other hand, here, it is shown that a USB memory is inserted in USB connector 21 having connector number CN2 although the attachment thereof is released. As another example, USB memories are attached to USB connectors 24, 25 having connector numbers CN5, CN6, respectively, and the attaching times are "7:00," "8:00," respectively.

Using FIG. 6, an example of job history management table 52 will be described.

Referring to FIG. 6, it is shown here that a process target, a job process, a status, and a process time are recorded as history.

Specifically, the arrangement is in the order of job process, and it is shown as an example that a data writing process for the USB memory attached to connector number CN1 was executed at 9:58 and the process has been completed.

It is shown as another example that a data deleting process for the USB memory attached to connector number CN1 was executed at 10:00 and the process has been completed.

It is shown as still another example that a data printing process for the USB memory attached to connector number CN3 was executed at 10:02 and the process has been completed.

It is shown as yet another example that a data printing process for the USB memory attached to connector number CN4 was executed at 10:10 and the process was cancelled without being completed.

It is shown as another example that a data printing process for the USB memory attached to connector number CN5 was executed at 10:15 and the process was ended as an error process without being completed.

Here, it is assumed, for example, that the attachment information similar to that illustrated in FIG. 5 is stored in USB device management table 67 and the history information similar to that illustrated in FIG. 6 is stored in job history management table 52. Specifically, it is assumed that USB device management table 67 stores the attachment information in which the USB memory inserted in connector number CN2 is not attached and those in the other connector numbers CN1, CN3-CN6 are being attached, and job history management table 52 stores the history information in which jobs have been executed for the USB memories corresponding to connector numbers CN1, CN3, CN4, CN5.

In this case, consider releasing the attachment of the USB device in USB device management unit 65 when logout is executed.

Referring to FIG. 4 again, in step S2, USB memories are attached to connector numbers CN1, CN3-CN6, and therefore the process proceeds to the next step. In step S3, the jobs have been executed for the USB memories corresponding to connector numbers CN1, CN3, CN4, CN5, and therefore in this example the USB memories corresponding to connector numbers CN1, CN3, CN4, CN5 are released from attachment.

On the other hand, for the USB memory corresponding to connector number CN6, the job has not been executed and therefore the attachment is not released. When the attachment is to be released, releasing the attachment has to be executed manually, that is, by user choice.

Execution of selecting and releasing attachment of a USB device by user choice will now be described.

Using FIG. 7, a transition screen in a case where USB button 214 in the screen in FIG. 3 is pressed will be described.

Referring to FIG. 7, displayed here are a "select" button 230 for making a selection of a USB device and a "release attachment" button 232 for releasing attachment of a USB device.

A cancel button 234 for terminating the process for the USB device is also displayed. Pressing cancel button 234 returns to the previous screen in FIG. 3.

Using FIG. 8, a transition screen in a case where "release attachment" button 232 in the screen in FIG. 7 is pressed will be described.

Figure 8:
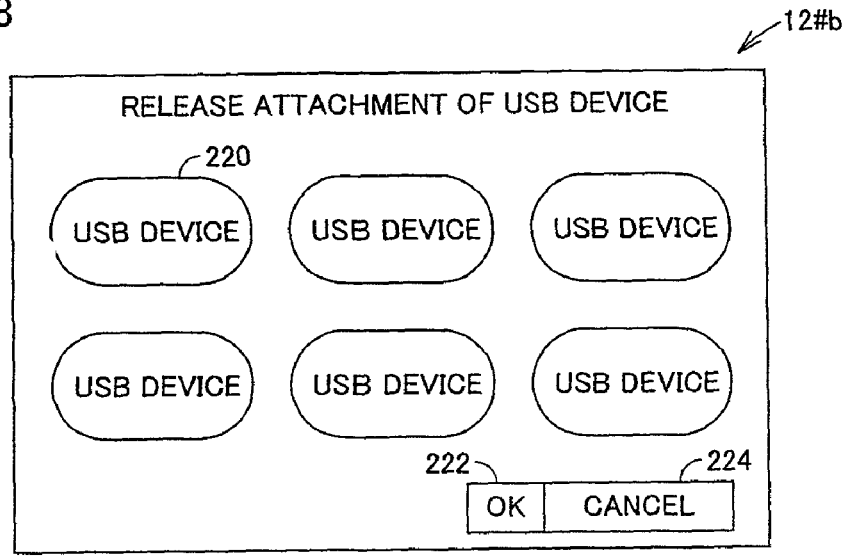
FIG. 8 illustrates a transition screen in a case where a "release attachment" button is pressed in the screen in FIG. 7.

Referring to FIG. 8, in order to release attachment of the USB device, here, six USB devices attached to the respective USB connectors are displayed, and the user can select the USB device attached to the USB connector to release attachment for the selected USB device. For example, USB device 220 is selected and an "OK" button 222 is pressed so that the attachment can be released for the selected USB device 220. On the other hand, pressing a "cancel" button 224 returns to the previous screen.

Execution of the operation allows the user to execute releasing the attachment of the USB device manually, that is, by user choice.

Using FIG. 9, a transition screen in a case where "select" button 230 in the screen in FIG. 7 is pressed will be described.

Figure 9:
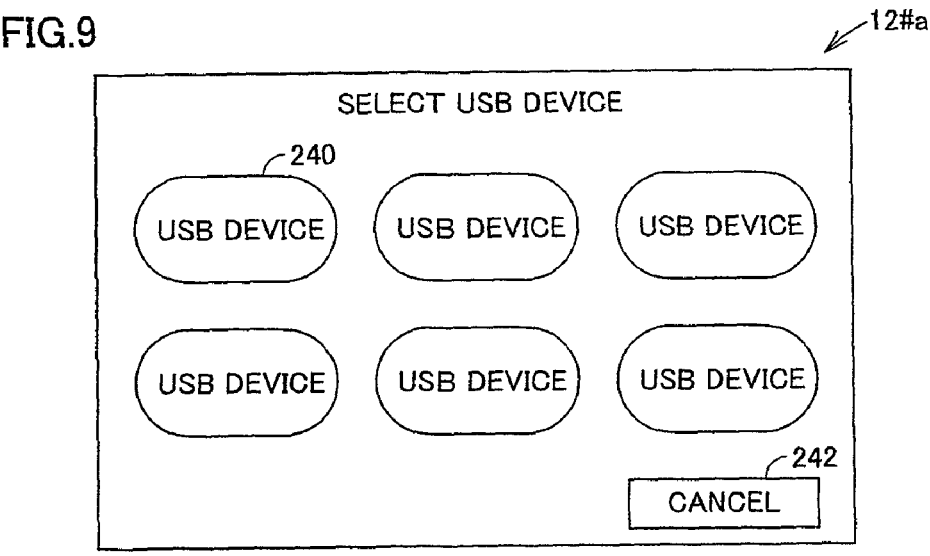
FIG. 9 illustrates a transition screen in a case where a "select" button is pressed in the screen in FIG. 7.

Referring to FIG. 9, here, a process such as viewing or reading a file stored in a USB device, for example, can be executed by selecting a USB device. As an example, here six USB devices attached to the respective USB connectors are displayed, and the user can select the USB device attached to the USB connector to view the file stored in the USB device and also execute a prescribed process on the file stored in the USB device.

For example, the user presses the button of USB device 240 to execute access to the selected USB device 240.

Using FIG. 10, a case where a list of files stored in the USB device is displayed when USB device 240 is pressed in the select screen in FIG. 9 will be described.

Figure 10:
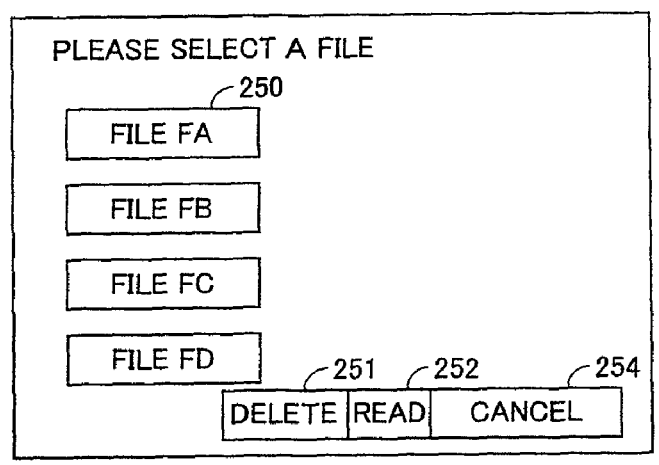
FIG. 10 illustrates a case where a list of files stored in a USB device is displayed when the USB device is pressed in the select screen in FIG. 9.

Referring to FIG. 10, here, a list of four files stored in USB device 240 is displayed.

Specifically, a list of files FA-FD is shown. Here, the user selects the file and then presses a "read" button 252 so that a process of reading the selected file is executed. Specifically, a process of reading data in the selected file stored in the USB device is executed. Then, for example, a printing process or the like can be executed on the read data in printer unit 14.

It is noted that when a process of reading data from the selected file stored in the USB device is executed, the data reading process for the USB device is stored as a job process in the aforementioned job history management table 52.

On the other hand, a "delete" button 251 shown in FIG. 10 is pressed so that a process of deleting data from the selected file is executed. When the process of deleting data from the selected file stored in the USB device is executed, the data deleting process for the USB device is stored as a job process in the aforementioned job history management table 52.

Then, pressing a "cancel" button 254 shown in FIG. 10 returns to the previous screen. In other words, the file list display is ended.

In this case, the files stored in USB device 240 are merely viewed without executing a specific job, so that a job process is not stored in the aforementioned job history management table 52.

For example, in a case where a plurality of USB devices of a plurality of users are attached to the USB connectors, when one of the users intends to use his/her own USB device, he/she may confirm the contents of the USB device and then execute a prescribed operation for his/her own USB device. In such a case, the user may possibly erroneously access the USB device owned by the other person.

Therefore, in the case where the access to the USB device results in only viewing the files stored in the USB device, this processing is not included in the job history, thereby preventing releasing, at the time of logout, the attachment of the USB device that is erroneously accessed and may be owned by the other person.

In other words, it is possible to automatically release attachment of only the USB device for which the user has executed a job and that is likely to be determined to be owned by the user and not to automatically release attachment of the other USB device that is likely to be determined to be irrelevant. Accordingly, the USB device that is likely to be owned by the user is released from attachment after logout, thereby preventing the other user from easily accessing it, and thus improving safety. The USB device that is likely to be owned by the other user is not released from attachment, thereby improving the other user's convenience.

Modification of First Embodiment

According to the scheme in the foregoing first embodiment, even for the USB device attached since before login, if the job execution history exists, the attachment of the USB device having the job execution history is released.

Using FIG. 11, the flow of releasing attachment of a USB device in USB device management unit 65 in accordance with a modification of the first embodiment of the present invention will be described.

Figure 11:
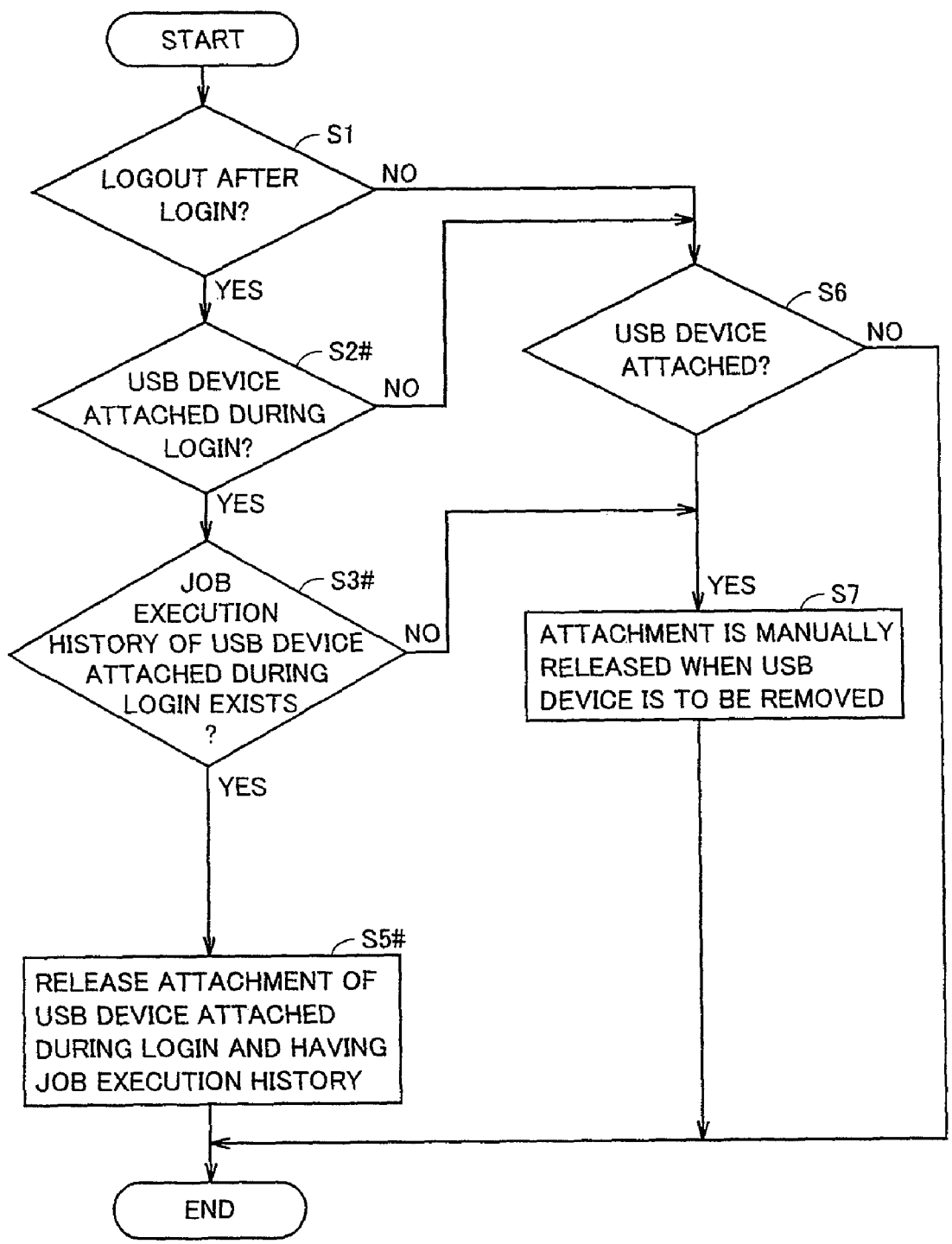
FIG. 11 is a flowchart illustrating a flow of releasing attachment of a USB device in the USB device management unit in accordance with a modification of the first embodiment of the present invention.

Referring to FIG. 11, it is determined whether or not logout is executed after login (step S1). More specifically, it is determined whether or not a user authentication process is executed and the authentication processing state is ended. If the user authentication process is executed and the authentication processing state is ended in step S1, the process proceeds to the next step S2#. If login and logout are not executed, that is, if the user authentication process is not executed, the process proceeds to step S6. If a USB device is attached in step S6, then the attachment is manually released when the USB device is to be removed (step S7). On the other hand, if a USB device is not attached in step S6, the process ends (END).

If the user authentication process is executed and ended in step S2#, then it is determined whether a USB device has been attached during login, that is, in the user authentication processing state. Specifically, by referring to USB device management table 67, it is possible to determine whether or not there exists a USB device attached to a USB connector and also to determine whether or not the USB device has been attached during login (in the user authentication processing state) based on the attaching time of the attached USB device and the login time.

If there exists no USB device attached to a USB connector during login in step S2#, it is likely that no USB device is attached or a USB device owned by the other user is attached, and the process therefore proceeds to step S6.

If a USB device is attached in step S6, then the attachment is manually released when the USB device is to be removed (step S7).

On the other hand, if a USB device has been attached during login in step S2#, it is determined whether or not there exists job execution history of the USB device attached during login (step S3#). Specifically, the determination can be made by referring to job history management table 52 to determine whether the job for the USB device attached during login has been executed or not.

Then, if the job execution history of the USB device attached during login exists, that is, if the execution history of the job for the USB device attached during login exists in job history management table 52, in step S3#, the attachment of the USB device attached during login and having the job execution history is released (step S5#).

Through this process, USB device management unit 65 releases attachment for the USB device that has been attached during login and for which job has actually been executed, among the USB devices attached to the USB connectors.

In other words, it is possible to automatically release attachment of only the USB device that is attached during the user logging-in and is likely to be determined to be owned by the user who has executed a job, and not to automatically release attachment of the other USB device that is likely to be determined to be irrelevant. Accordingly, only the USB device that is likely to be owned by the user is released from attachment after logout, thereby preventing the other users from easily accessing it, and thus improving safety. The USB device that is likely to be owned by the other user is not released from attachment, thereby improving the other user's convenience.

On the other hand, if a USB device has been attached during login and if there exists no job execution history for the USB device attached during login in step S3#, the process proceeds to step S7. For example, a USB device owned by the other user may possibly have been attached during login, and therefore in such a case the process proceeds to step S7 without releasing the attachment of the USB device. When the USB device is to be removed, the attachment is manually released (step S7).

The other points are similar to those described in the first embodiment and therefore the detailed description will not be repeated.

Second Modification of First Embodiment

According to the scheme in the foregoing first embodiment, when job execution history is found by referring to job history management table 52, the attachment of the USB device having the job execution history is released. Depending on the contents of the job execution history, however, the job for the USB device owned by the other user may be executed in some cases.

Using FIG. 12, the flow of releasing attachment of a USB device in USB device management unit 65 in accordance with a second modification of the first embodiment of the present invention will be described.

Figure 12:
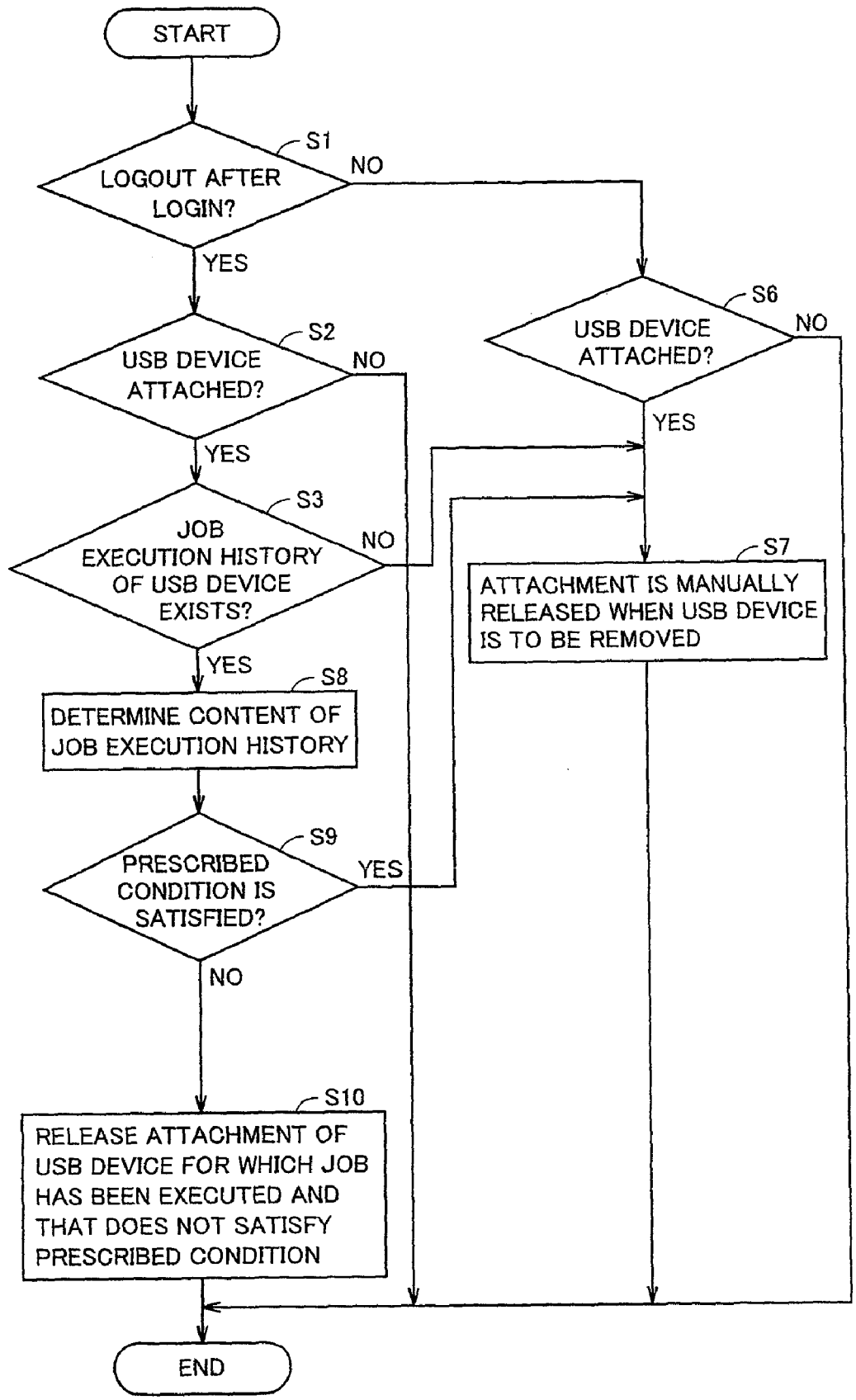
FIG. 12 is a flowchart illustrating a flow of releasing attachment of a USB device in the USB device management unit in accordance with a second modification of the first embodiment of the present invention.

Referring to FIG. 12, the flow up to step S3 is similar to the flow illustrated in FIG. 4 and therefore the detailed description will not be repeated.

If the job execution history of the USB device exists, that is, if the job execution history for the USB device exists in job history management table 52, in step S3, then the contents of the job execution history is determined (step S8).

Then, it is determined whether a prescribed condition is satisfied or not, as a result of determination of the contents of the job execution history (step S9).

If it is determined that the job execution history satisfies a prescribed condition in step S9, the process proceeds to step S7, and when the USB device is to be removed, the attachment is manually released (step S7). More specifically, even when the USB device is attached to the USB connector, an instruction to release attachment is not output.

On the other hand, if it is determined that the job execution history does not satisfy a prescribed condition in step S9, that is, in the case other than a prescribed condition, the attachment of the USB device for which job has been executed and which does not satisfy a prescribed condition is released (step S10). The process then ends (END).

Here, the above-noted prescribed condition corresponds to the case where the user executes a job by an operating error and the case where the user executes a job for the USB device owned by the other user.

This process excludes the case where although the user has executed a job the job has been executed by an operating error, whereby it is possible to automatically release attachment of the USB device only when it is likely to be determined that a job has been executed for the one owned by the user, and not to automatically release attachment of the other USB device that is likely to be determined to be irrelevant.

Using FIG. 13, the flow of determining whether a prescribed condition is satisfied or not when the content of the job execution history is determined will be described.

Figure 13:
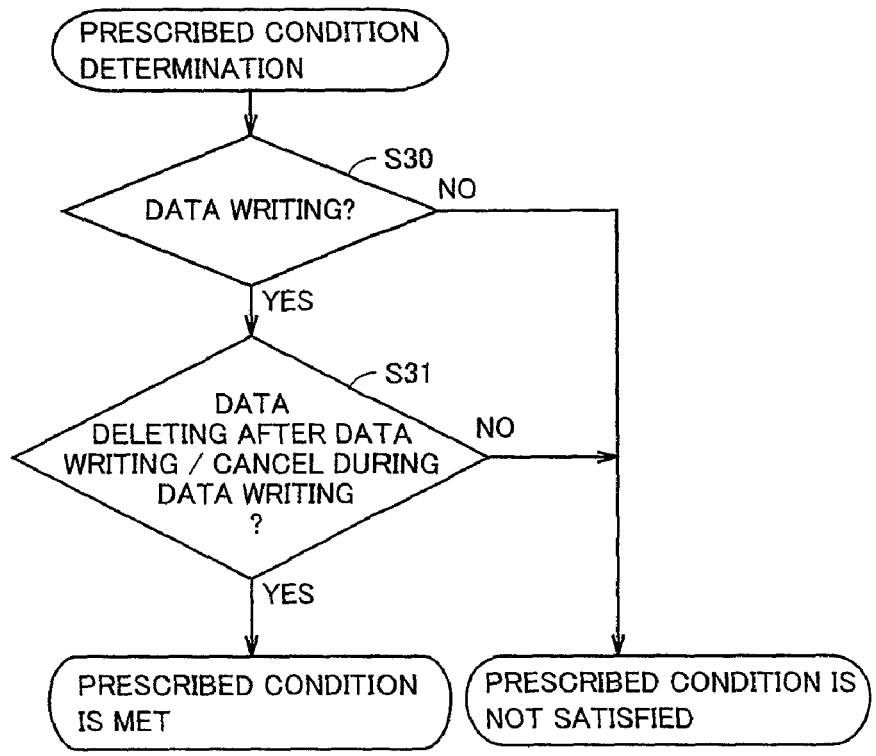
FIG. 13 is a flowchart illustrating a flow of determination as to whether a prescribed condition is satisfied or not when the content of job execution history is determined.

Referring to FIG. 13, first, it is determined whether a data writing process has been performed or not based on the content of the job execution history for the attached USB device (step S30). In other cases, it is determined that a prescribed condition is not satisfied.

If a data writing process has been performed in step S30, then it is determined whether a data deleting process has been executed or not after the data writing process or whether a cancel process has been performed or not during data writing (step S31). In other cases, that is, if a data deleting process is not performed after the data writing process or if a cancel process is not performed during data writing, it is determined that a prescribed condition is not satisfied.

Then, if a data deleting process has been executed after the data writing process in step S31, it is determined that a prescribed condition is met.

Alternatively, if a cancel process is performed during the data writing process in step S31, it is determined that a prescribed condition is met.

Then, if a prescribed condition is met, the process proceeds to step S7, and when the USB device is to be removed, the attachment is manually released.

Through this process, for example, even when a job of a data writing process is executed, if a data deleting process is thereafter executed, then it can be assumed that the user may erroneously execute a data writing process for a USB device owned by the other user and then execute a data deleting process. In such a case, it is possible not to automatically release attachment of the USB device, assuming that the USB device may possibly be owned by the other user though being included in the job execution history.

Furthermore, even when a job of a data writing process is executed, if a cancel process is executed during data writing, then it can be assumed that the user may erroneously execute a data writing process for a USB device owned by the other user and then execute a cancel process halfway in the process. In such a case, it is possible not to automatically release attachment of the USB device, assuming that the USB device may possibly be owned by the other user though being included in the job execution history.

The determination of another prescribed condition will now be described.

Using FIG. 14, the flow of determining whether a prescribed condition is satisfied or not when the content of the job execution history is determined will be described.

Figure 14:
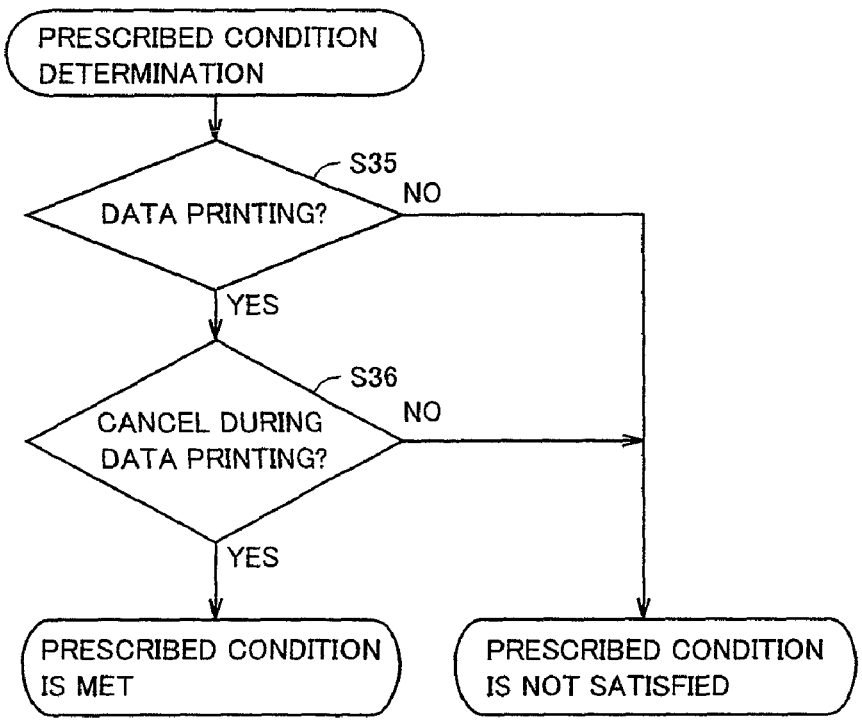
FIG. 14 is a flowchart illustrating another exemplary flow of determination as to whether a prescribed condition is satisfied or not when the content of job execution history is determined.

Referring to FIG. 14, first, it is determined whether or not a data printing process has been performed based on the content of the job execution history for the attached USB device (step S35). In other cases, that is, if a data printing process is not performed, it is determined that a prescribed condition is not satisfied.

If a data printing process has been performed in step S35, then it is determined whether or not a cancel process has been performed during data printing (step S36). In other cases, that is, if a cancel process is not performed during data printing, it is determined that a prescribed condition is not satisfied.

Then, if a cancel process has been executed during data printing in step S36, it is determined that a prescribed condition is met.

Then, if a prescribed condition is met, the process proceeds to step S7, and when the USB device is to be removed, the attachment is manually released.

Through this process, for example, even when a job of a data printing process is executed, if a cancel process is executed during data printing, the user may possibly erroneously access the USB device owned by the other user to execute the data printing process for the stored data and then execute a cancel process halfway in the process, and therefore in such a case, it is possible not to automatically release attachment of the USB device, assuming that the USB device may be owned by the other user though being included in the job execution history.

Here, for example, it is assumed that the attachment information similar to that illustrated in FIG. 5 is stored in USB device management table 67 and the history information similar to that illustrated in FIG. 6 is stored in job history management table 52. Specifically, USB device management table 67 stores the attachment information indicating that the USB memory inserted in connector number CN2 is not attached and those in the other connector numbers CN1, CN3-CN6 are being attached, and job history management table 52 stores the history information indicating that the jobs have been executed for the USB memories corresponding to connector numbers CN1, CN3, CN4, CN5.

In this case, consider releasing attachment of a USB device in USB device management table 65 when logout is executed.

Referring to FIG. 12 again, the job execution history content is determined in step S8. Specifically, with reference to job history management table 52 as described above, consider the USB memory attached to connector number CN1. The stored history information indicates that a data deleting process has been executed after execution of a data writing process, for the USB memory attached to connector number CN1.

A prescribed condition is therefore met as illustrated in the flow in FIG. 13. Accordingly, a prescribed condition is satisfied in step S9 in the flowchart of FIG. 12, and the process then proceeds to step S7.

On the other hand, consider the USB memory attached to connector number CN3. The stored history information indicates that a data printing process has been executed and then completed, for the USB memory attached to connector number CN3.

Accordingly, a prescribed condition is not satisfied as illustrated in the flow in FIG. 14. A prescribed condition is therefore not satisfied in step S9 in the flowchart of FIG. 12, and the process then proceeds to step S10.

Now, consider the USB memory attached to connector number CN4. The stored history information indicates that a data printing process has been executed and a cancel process has been performed during the execution, for the USB memory attached to connector number CN4.

Accordingly, a prescribed condition is met as illustrated in the flow in FIG. 14. A prescribed condition is therefore satisfied in step S9 in the flowchart of FIG. 12, and the process then proceeds to step S7.

Now, consider the USB memory attached to connector number CN5. The stored history information indicates that a data printing process has been executed resulting in an error process, for the USB memory attached to connector number CN5. An example of the error process is a case where a printing operation cannot be executed for lack of printing paper.

Accordingly, a prescribed condition is not satisfied as illustrated in the flow in FIG. 14. A prescribed condition is therefore not satisfied in step S9 in the flowchart of FIG. 12, and the process then proceeds to step S10.

Through this process, in this example, the attachment is released for the USB memories corresponding to connector numbers CN3, CN5. On the other hand, the attachment is not released for the USB memories corresponding to connector numbers CN1, CN2, CN4, CN6, and when the attachment is to be released, releasing the attachment has to be executed manually, that is, by user choice.

Thus, even when a job has been executed for a USB device, if the user may have executed the job by an operating error for the USB device owned by the other user, it is possible not to automatically release attachment of the USB device, assuming that the USB device may possibly be owned by the other user though being included in the job execution history.

In other words, it is possible to automatically release attachment of only the USB device for which the user has executed a job and that is likely to be determined to be owned by the user, and not to automatically release attachment of the other USB device that is likely to be determined to be irrelevant. Accordingly, the USB device that is likely to be owned by the user is released from attachment after logout, thereby preventing the other user from easily accessing it, and thus improving safety. The USB device that is likely to be owned by the other user is not released from attachment, thereby improving the other user's convenience.

It is noted that, as explained in the first modification of the first embodiment of the present invention, that a USB device is attached after login may be included as a condition of the flow, as a matter of course.

Second Embodiment

According to the scheme in the foregoing first embodiment, the job execution history is referred to and attachment of a USB device is released based on the job execution history.

In a second embodiment of the present invention, a scheme of releasing attachment of a USB device based on the user operation history will be described.

Using FIG. 15, the functional blocks of MFP 1# as an image formation apparatus in accordance with the second embodiment of the present invention will be described.

Figure 15:
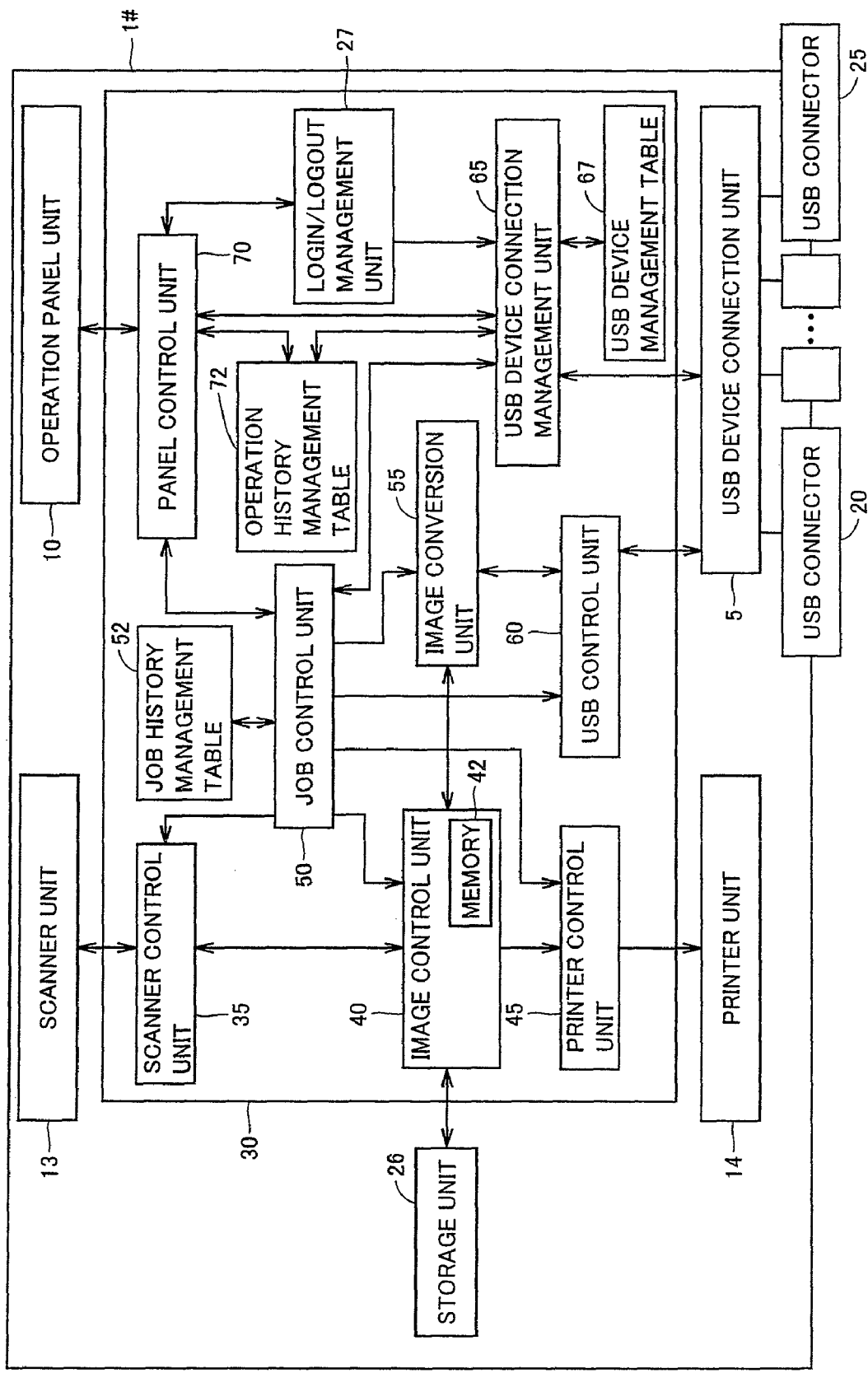
FIG. 15 is a functional block diagram of MFP as an image formation apparatus in accordance with a second embodiment of the present invention.

Referring to FIG. 15, MFP 1# in accordance with the second embodiment of the present invention differs from MFP 1 illustrated in FIG. 2 in that an operation history management table 72 is further added. The other points are similar and the detailed description will not be repeated.

Operation history management table 72 is a management table in which operation history of operations by the user through operation panel unit 10 is recorded.

Using FIG. 16, operation history management table 72 will be described.

Referring to FIG. 16, here, the user operates operation panel unit 10, so that panel control unit 70 receives the content of an operation instruction and stores the content of an operation process executed based on the instruction into operation history management table 72, by way of example.

Specifically, the arrangement is in the order of operation time, and it is shown as an example that an operation of a USB device selecting process was executed for the USB memory attached to connector number CN1 at operation time "12:02." The USB device selecting process corresponds to, for example, an operation of the user pressing the button of USB device 240 in the transition screen in FIG. 9 after "select" button 230 is pressed in the transition screen in FIG. 7.

It is shown that, at operation time "12:04," the operation of the USB device selecting process was ended for the USB memory attached to connector number CN1.

Then, at operation time 12:08, an operation of a USB device selecting process was executed for the USB memory attached to connector number CN3.

Then, at operation time 12:10, an operation of a file selecting process was executed for the USB memory attached to connector number CN3.

Then, at operation time 12:12, an operation of a file reading process was executed for the USB memory attached to connector number CN3.

Then, at operation time 12:14, an operation of a print process was executed for the USB memory attached to connector number CN3.

Using FIG. 17, the flow of releasing attachment of a USB device in USB device management unit 65 in accordance with the second embodiment of the present invention will be described.

Figure 17:
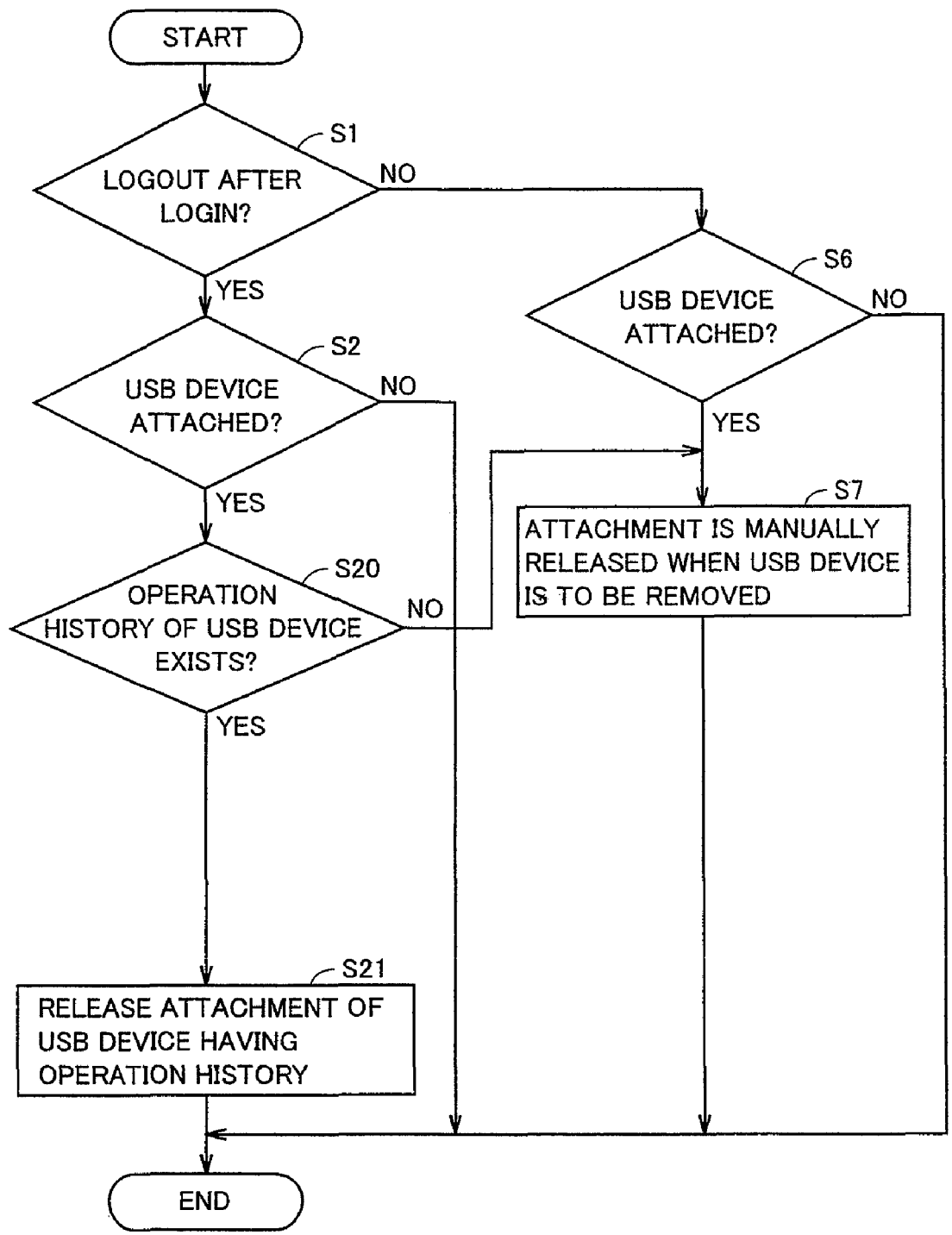
FIG. 17 is a flowchart illustrating a flow of releasing attachment of a USB device in the USB device management unit in accordance with the second embodiment of the present invention.

Referring to FIG. 17, the process up to step S2 is similar to that in the flowchart in FIG. 4 except that the determination of execution of a job process followed by a user authentication process is replaced by the determination of execution of an operation process followed by a user authentication process.

If a USB device attached to a USB connector does not exist in USB device management table 67 in step S2, there is no need for releasing attachment of a USB device and the process therefore ends (END).

On the other hand, if a USB device is attached, that is, if a USB device attached to a USB connector exists in USB device management table 67, in step S2, then it is determined whether or not there exists operation history of the USB device (step S20). Specifically, the determination can be made by referring to operation history management table 72 to determine whether or not an operation process for the USB device attached to the USB connector has been executed through operation panel 10.

If there exists operation history of the USB device, that is, if the operation process for the USB device exists in operation history management table 72, in step S20, the attachment of the USB device having the operation history is released (step S21).

Through this process, the attachment is released for the USB device for which an operation process has actually been executed through operation panel 10, among the USB devices attached to the USB connectors, so that USB device management table 65 does not output an instruction to release the attachment when the USB device for which an operation process has not been executed through operation panel 10 is attached to the USB connector.

In other words, it is possible to automatically release attachment of only the USB device for which the user has executed an operation process through operation panel 10 and that is likely to be determined to be owned by the user, and not to automatically release attachment of the other USB device that is likely to be determined to be irrelevant. Accordingly, the USB device that is likely to be owned by the user is released from attachment after logout, thereby preventing the other user from easily accessing it, and thus improving safety. The USB device that is likely to be owned by the other user is not released from attachment, thereby improving the other user's convenience.

On the other hand, if a user authentication process is not executed in step S1, the process proceeds to step S6 to determine whether or not a USB device is attached (step S6).

If there exists no operation history of the USB device, that is, if the operation process for the USB device does not exist in operation history management table 72, in step S20, the process proceeds to step S7 without releasing attachment of the USB device, because it is likely that the USB device owned by the other user has been attached since before login. Specifically, when the USB device is to be removed, the attachment is manually removed (step S7).

Here, for example, it is assumed that attachment information similar to that illustrated in FIG. 5 is stored in USB device management table 67 and operation history information similar to that illustrated in FIG. 16 is stored in operation history management table 72. Specifically, it is assumed that USB device management table 67 stores the attachment information indicating that the USB memory inserted in connector number CN2 is not attached and those in the other connector numbers CN1, CN3-CN6 are being attached, and that operation history management table 72 stores the operation history information indicating that an instruction for an operation process is given for the USB memories corresponding to connector numbers CN1, CN3.

In this case, consider releasing attachment of a USB device in USB device management unit 65 when the user authentication processing state is ended, that is, logout.

Referring to FIG. 17 again, since the USB memories are attached for connector numbers CN1, CN3-CN6 in step S2, the process proceeds to the next step. In step S20, referring to operation history management table 72, an operation process has been executed for the USB memories corresponding to connector numbers CN1, CN3, so that in this example, the attachment is released for the USB memories corresponding to connector numbers CN1, CN3.

On the other hand, for the USB memories corresponding to connector numbers CN4, CN5, CN6, the attachment is not released, and when the attachment is to be released, releasing the attachment has to be executed manually, that is, by user choice.

According to this scheme, based on the user operation history, it is possible to automatically release attachment only for the USB device for which the user has executed an operation process through operation panel 10 and that is likely to be determined to be owned by the user, and not to automatically release attachment of the other USB device that is likely to be determined to be irrelevant.

It is noted that, as explained in the first modification of the first embodiment of the present invention, that a USB device is attached after login may be included as a condition of the flow, as a matter of course.

First Modification of Second Embodiment

According to the scheme in the foregoing second embodiment, if there exists operation history, the attachment of the USB device having operation history is released. Depending on the content of the operation history, however, it is possible that the operation process for the USB device owned by the other user has been executed.

Using FIG. 18, the flow of releasing attachment of a USB device in USB device management unit 65 in accordance with a first modification of the second embodiment of the present invention will be described.

Figure 18:
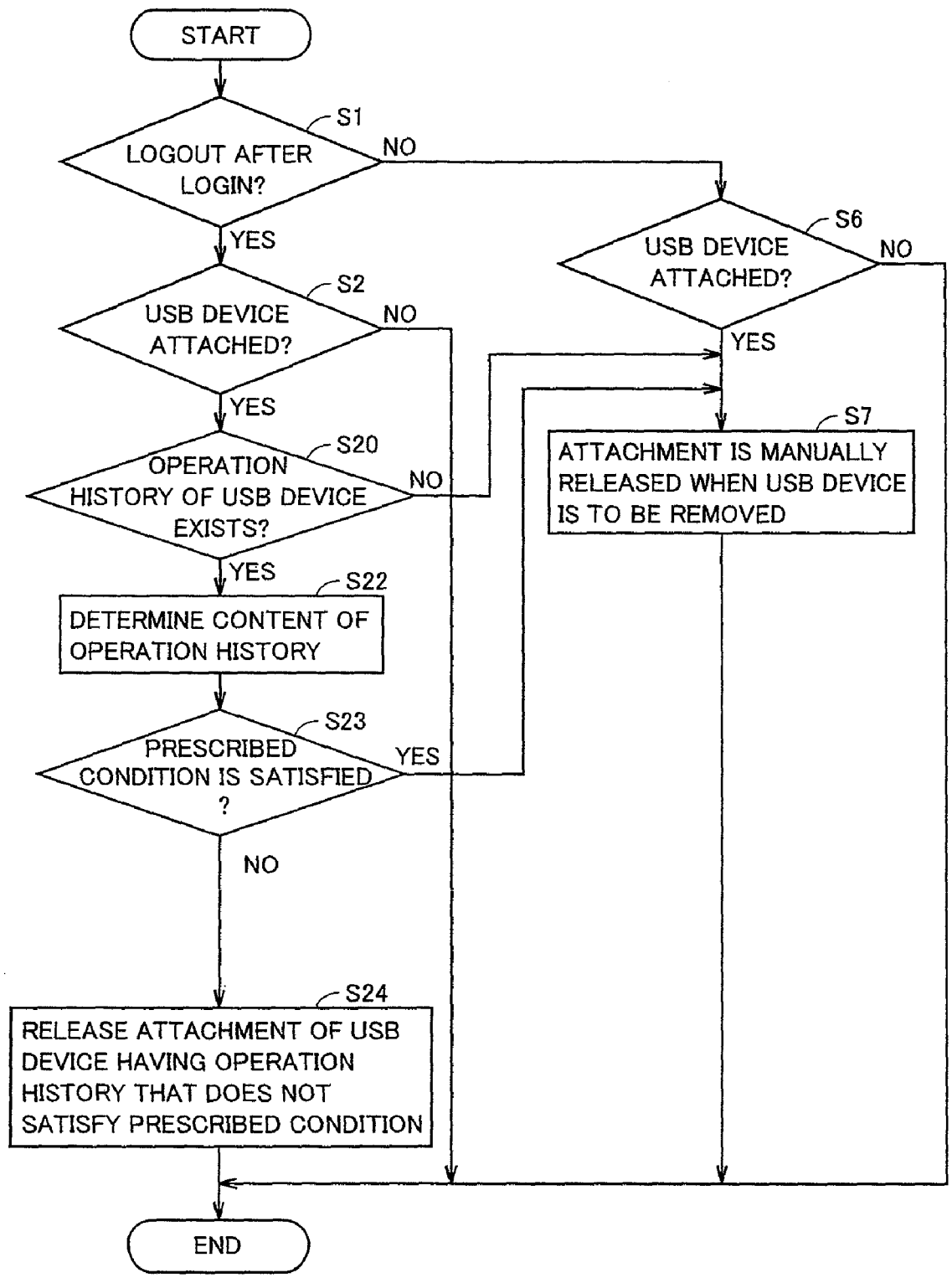
FIG. 18 is a flowchart illustrating a flow of releasing attachment of a USB device in the USB device management unit in accordance with a first modification of the second embodiment of the present invention.

Referring to FIG. 18, the flow up to step S20 is similar to the flow in FIG. 17 and therefore the detailed description will not be repeated.

If there exists operation history of the USB device, that is, if operation history for the USB device exists in operation history management table 72, in step S20, then the content of the operation history is determined (step S22).

Then, it is determined whether or not a prescribed condition is satisfied as a result of the determination of the content of the operation history (step S23).

If it is determined that the operation history satisfies a prescribed condition in step S23, the process proceeds to step S7, and when the USB device is to be removed, the attachment is manually released (step S7). In other words, even if a USB device is attached to a USB connector, an instruction to release the attachment is not output.

On the other hand, if it is determined that the operation history does not satisfy a prescribed condition, that is, in a case other than a prescribed condition, in step S23, the attachment of the USB device having the operation history that does not satisfy a prescribed condition is released (step S24). The process then ends (END).

Here, the above-noted prescribed condition corresponds to the case where the user executes a prescribed operation process by an operating error for the USB device using operation panel unit 10 and the case where the user executes a prescribed operation process such as access for the USB device owned by the other user.

This process excludes the case where although the user has operated operation panel unit 10 to execute a prescribed process for the USB device, the operation process has been executed by an operating error, whereby it is possible to automatically release attachment of only the USB device for which a prescribed operation process has been executed and that is likely to be determined to be owned by the user, and not to automatically release attachment of the other USB device that is likely to be determined to be irrelevant.

For example, referring to operation history management table 72 in place of job history management table 52, in accordance with the scheme similar to that illustrated in FIG. 13 and FIG. 14, it can be determined that a prescribed condition is met in the case where an operation instruction for a data deleting process is executed after an operation instruction for a data writing process or the case where an operation instruction for a cancel process is executed after an operation instruction for a data writing process.

In addition, in the case where an operation instruction for a cancel operation is executed after an operation instruction for a data printing process, it can be determined that a prescribed condition is met.

Through this process, similarly to the foregoing description, for example, even when an operation instruction for a data writing process is executed, if a data deleting process is thereafter executed, it can be assumed that the user may erroneously execute the operation instruction for a data writing process for the USB device owned by the other user and thereafter execute an operation instruction for a data deleting process, and therefore in such a case, it is possible not to automatically release attachment of the USB device, assuming that the USB device may be owned by the other user although the operation history includes the information that the USB device has been operated.

Furthermore, even when an operation instruction for a data writing process is executed, if an operation instruction for a cancel process is executed during data writing, it can be assumed that the user may erroneously execute the operation instruction for a data writing process for the USB device owned by the other user and then execute the operation instruction for a cancel process halfway in the process, and therefore in such a case, it is possible not to automatically release attachment of the USB device, assuming that the USB device may be owned by the other user although the operation history includes the information that the USB device has been operated.

Furthermore, for example, even when an operation instruction for a data printing process is executed, if an operation instruction for a cancel operation is executed during data printing, it can be assumed that the user may erroneously access the USB device owned by the other user to execute the operation instruction for a data printing process for the stored data and then execute an operation instruction for a cancel process halfway in the process, and therefore in such a case, it is possible not to automatically release attachment of the USB device, assuming that the USB device may be owned by the other user although the operation history includes the information that the USB device has been operated.

Using FIG. 19, the flow of determination as to whether or not a prescribed condition is satisfied when the content of operation history is determined will be described.

Figure 19:
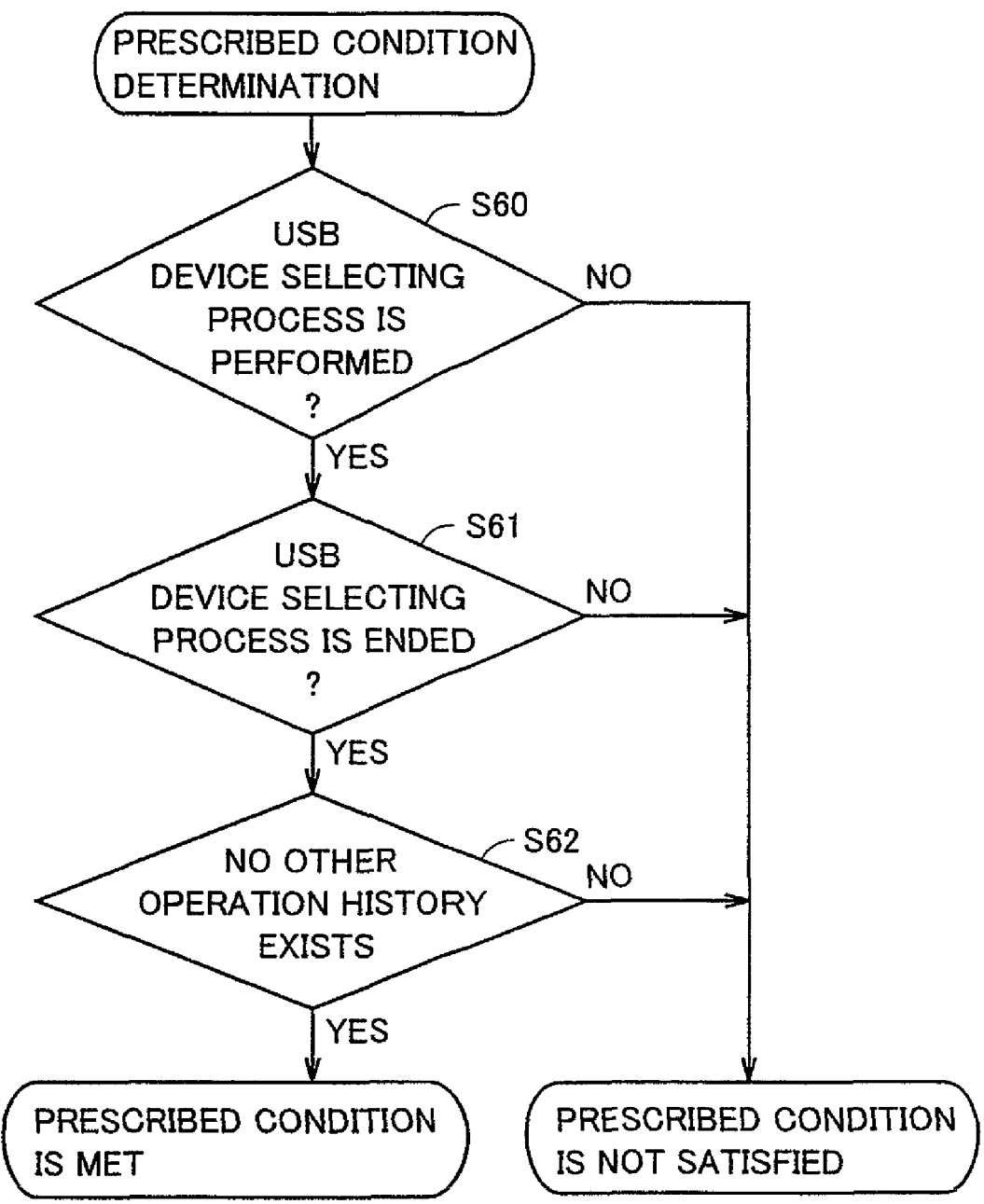
FIG. 19 is a flowchart illustrating a flow of determination as to whether a prescribed condition is satisfied or not when the content of operation history is determined.

Referring to FIG. 19, first, referring to the operation history, it is determined whether or not an operation instruction for a USB device selecting process has been given for the attached USB device (step S60). If an operation instruction is not given, it is determined that a prescribed condition is not satisfied.

Then, referring to the operation history, if an operation instruction for a USB device selecting process is given for the USB device in step S60, then it is determined whether or not an operation instruction to end the USB device selecting process has been given (step S61). If an operation instruction to end the USB device selecting process is not given, it is determined that a prescribed condition is not satisfied.

Then, if an operation instruction to end the USB device selecting process has been given in step S61, then referring to the operation history it is determined whether or not any other operation history exists (step S62). Referring to the operation history, if any other operation history exists, it is determined that a prescribed condition is not satisfied.

Then, if any other operation history does not exist, that is, if only the USB device selecting process has been executed and the process then ends, in step S62, it is determined that a prescribed condition is met.

Through this process, for example, in the case where a plurality of USB devices of a plurality of users are attached to the USB connectors, when one of the users intends to use his/her own USB device, he/she may confirm the contents of the USB device to execute a prescribed operation for his/her own USB device. In such a case, the user may possibly erroneously access the USB device owned by the other person.

Therefore, in such a case, more specifically, in the case where a USB device selecting process is executed and an operation instruction to end the USB device selecting process is thereafter executed, it can be assumed that the access may be an error, so that it is possible to prevent releasing the attachment of the USB device at a time of logout, for the USB device that may be owned by the other person.

In the above-noted prescribed condition in FIG. 19, if a USB device selecting process is executed and an operation instruction to end the USB device selecting process is thereafter executed, if only an operation instruction for the USB device selecting process is given, releasing the attachment of the USB device at a time of logout is prevented. It is also possible to employ a scheme of releasing the attachment of the USB device at a time of logout if any other condition is additionally satisfied.

Using FIG. 20, a flow of determination as to whether or not a prescribed condition is satisfied when the content of operation history is determined will be described.

Figure 20:
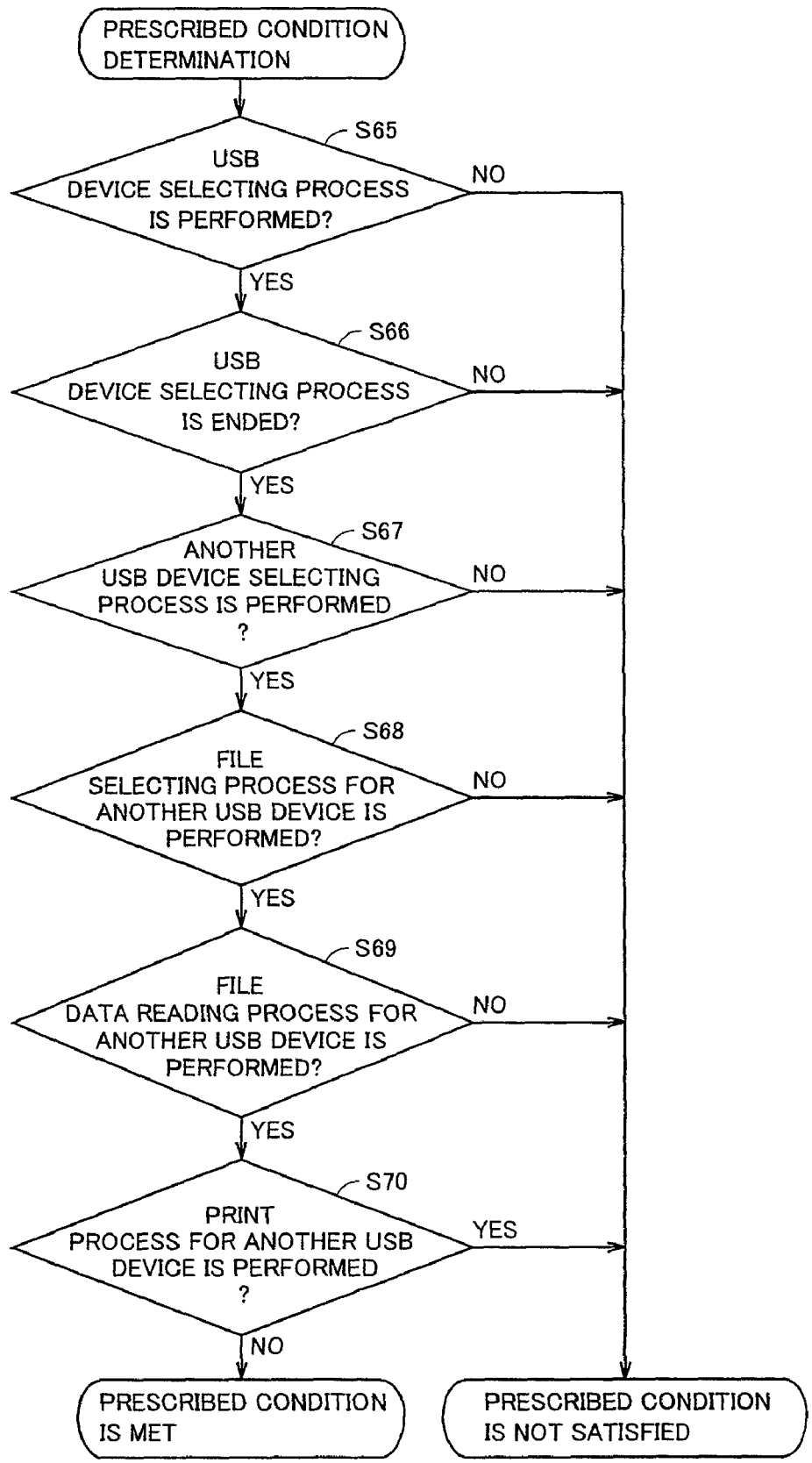
FIG. 20 is a flowchart illustrating another exemplary flow of determination as to whether a prescribed condition is satisfied or not when the content of operation history is determined.

Referring to FIG. 20, first, referring to the operation history, it is determined whether or not a USB device selecting process for the attached USB device has been performed (step S65). If the operation history of a USB device selecting process does not exist, it is determined that a prescribed condition is not satisfied.

Then, referring to the operation history, if a USB device selecting process for the USB device has been performed in step S65, then it is determined whether or not the USB device selecting process is ended (step S66). Then, if the USB device selecting process is not ended, it is determined that a prescribed condition is not satisfied.

Then, if the USB device selecting process is ended in step S66, then it is determined whether or not another USB device selecting process has been performed (step S67). If another USB device selecting process is not performed, it is determined that a prescribed condition is not satisfied.

Then, if another USB device selecting process has been performed in step S67, then it is determined whether or not a file selecting process for another USB device has been performed (step S68). If a file selecting process for another USB device is not performed, it is determined that a prescribed condition is not satisfied.

Then, if a file selecting process for another USB device has been performed in step S68, then it is determined whether or not a file data reading process for another USB device has been performed (step S69). If a file data reading process for another USB device is not performed, it is determined that a prescribed condition is not satisfied.

Then, if a file data reading process for another USB device has been performed in step S69, then it is determined whether or not a print process for another USB device has been performed (step S70). If a print process for another USB device is not performed, it is determined that a prescribed condition is not satisfied.

Then, if a print process for another USB device has been performed in step S70, it is determined that a prescribed condition is not met.

If a print process for another USB device is not performed in step S70, it is determined that a prescribed condition is met.

Then, if a prescribed condition is met, the process proceeds to step S7, and when the USB device is to be removed, the attachment is manually released.

For example, in the case where a plurality of USB devices of a user are connected to the USB connectors, when the user intends to use his/her own USB device, he/she may confirm the contents of each of the USB devices and then execute a prescribed operation for his/her own USB device.

In such a case, for example, the user executes a USB device selecting process for one of the attached USB devices, as a series of processes. Then, if it is determined that the desired file is not stored as a result of confirming the files stored in the selected USB device, then the USB device selecting process is ended.

Then, after the USB selecting process for one of the USB devices is ended, another USB device selecting process is executed. Then, if it is determined that the desired file is found as a result of confirming the files stored in the selected, another USB device, a file selecting process is executed for the desired file.

Then, a file data reading process is executed for the selected file in another USB device. Then, a print process may be executed for the read file data.

When this operation process flow is executed, it can also be determined that the USB device for which, as a series of processes, only the operation process of executing a USB device selecting process and ending the USB device selecting process is executed, may also be the one owned by the user.

In this example, this corresponds to the case where, for example, the operation history information as illustrated in FIG. 16 is stored as an operation procedure in operation history management table 72.

In such a case, for example, it is determined that a prescribed condition is not met, that is, a prescribed condition is not satisfied, for the USB memory attached to connector number CN1, so that the attachment of the USB device may be automatically released at a time of logout.

It is noted that the case where a prescribed condition is met or the case where a prescribed condition is not satisfied as described above is shown only by way of example. Depending on an operation procedure operated by the user, it may be designed to determine that a prescribed condition is met in a case of the operation procedure that is determined to be an operating error and it may be designed to determine that a prescribed condition is not satisfied in a case of the one that is determined not to be an operating error, so that it is possible to automatically release attachment only for the USB device for which the user has executed an operation process through operation panel 10 and that is likely to be owned by the user and not to automatically release attachment of the other USB device that is likely to be determined to be irrelevant, based on the user's operation history.

It is noted that, as explained in the first modification of the first embodiment of the present invention, that a USB device is attached after login may be included as a condition of the flow, as a matter of course.

Here, in this example, MFP provided with six connectors as USB connectors has been described. The present invention, however, is not limited thereto, and the number is not limited as long as more than one connectors are provided.

The image formation apparatus in accordance with the present invention is not limited to MFP and any other image formation apparatus may be employed such as a printer or a facsimile. For a controller controlling the image formation apparatus, a program may be provided which allows a computer to function to execute the control as described in the above-noted flows. Such a program may be recorded in a computer readable recording medium such as a flexible disk, a CD-ROM (Compact Disk-Read Only Memory), a ROM (Read Only Memory), a RAM (Random Access Memory), and a memory card, which accompanies a computer, and be provided as a program product. Alternatively, the program may be recorded in a recording medium such as a hard disk contained in a computer. Alternatively, the program may be downloaded via a network.

The program in accordance with the present invention may allow the process to be executed by invoking necessary modules, among program modules provided as a part of Operation System (OS) of a computer, in a prescribed sequence at a prescribed timing. In this case, the aforementioned modules are not included in the program itself and the process is executed in cooperation with OS. The program that does not include such modules may also be included in the program in accordance with the present invention.

Furthermore, the program in accordance with the present invention may be built in a part of another program. In this case, the modules included in another program are not included in the program itself, and the process is executed in cooperation with another program. Such a program built in another program may also be included in the program in accordance with the present invention.

The program product to be provided is installed in a program storage portion such as a hard disk for execution. It is noted that the program product includes the program itself and a recording medium having the program recorded thereon.

Although a USB memory has been described as an example of USB device in this example, the present invention is not limited to a USB memory and may also be applicable to any other auxiliary storage device such as SD (Secure Digital) cards.

The schemes of releasing attachment of a USB device as described in the foregoing first and second embodiments and the modifications thereof may be combined with each other.

Although in the foregoing embodiments, a user authentication process is executed using login/logout management unit 27 in the interior of MFP, the present invention is not limited thereto, and a user authentication process may be executed by an external authentication server connected via a network or the like.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing apparatus comprising:
    a plurality of connectors to each of which a removable storage device can be attached;
    a connection management unit for setting an electrically connected/not-connected state between the attached removable storage device and a corresponding connector among said plurality of connectors;
    a control unit for executing a job process for the attached removable storage device set in the electrically connected state with said corresponding connector;
    a history management unit for managing history information of the job process executed for the attached removable storage device set in the electrically connected state with said corresponding connector; and
    an authentication unit for executing a personal authentication process, wherein
    when the personal authentication process in said authentication unit is ended, said connection management unit sets the electrically connected state between said attached removable storage device and said corresponding connector to the not-connected state, based on whether or not there exists history information of the job process executed for the attached removable storage device set in the electrically connected state with said corresponding connector as managed by said history management unit.

2. The information processing apparatus according to claim 1, further comprising a state management unit for managing information of the connected state of the attached removable storage device among said plurality of connectors, wherein
    when the personal authentication process in said authentication unit is ended, said connection management unit sets the electrically connected state between said attached removable storage device and said corresponding connector to the not-connected state, if there exists history information of the job process executed for the attached removable storage device set in the electrically connected state with said corresponding connector as managed by said history management unit, and if it is determined that a removable storage device is attached after said personal authentication process is executed, based on the information of the connected state of said attached removable storage device as managed by said state management unit.

3. The information processing apparatus according to claim 1, wherein when the personal authentication process in said authentication unit is ended, if there exists history information of the job process executed for the attached removable storage device set in the electrically connected state with said corresponding connector as managed by said history management unit, said connection management unit determines whether or not a prescribed condition is satisfied based on content of said history information and sets the electrically connected state between said attached removable storage device and said corresponding connector to the not-connected state based on a result of the determination.

4. The information processing apparatus according to claim 3, wherein said connection management unit determines, as said prescribed condition, whether or not history of a job process executed by a user's operating error is included in said history information.

5. The information processing apparatus according to claim 3, wherein said connection management unit determines, as said prescribed condition, whether or not history of executing a data writing process of saving data and thereafter executing a data deleting process of deleting the saved data is included in said history information.

6. The information processing apparatus according to claim 3, wherein said connection management unit determines, as said prescribed condition, whether or not history of starting execution of a data writing process of saving data and thereafter canceling said data writing process is included in said history information.

7. The information processing apparatus according to claim 3, further comprising a printing unit for executing a printing process of printing data, wherein said connection management unit determines, as said prescribed condition, whether or not history of starting execution of a printing process of printing data and thereafter canceling said printing process is included in said history information.

8. The information processing apparatus according to claim 7, wherein said canceling the printing process includes cancelling said printing process based on a user's operation and cancelling said printing process based on a malfunction of said printing unit, and said connection management unit determines, as said prescribed condition, whether or not history of starting execution of a printing process of printing data and thereafter cancelling said printing process based on said user's operation is included in said history information.

9. An information processing apparatus comprising:

a plurality of connectors to each of which a removable storage device can be attached;

a connection management unit for setting an electrically connected/not-connected state between the attached removable storage device and a corresponding connector among said plurality of connectors;

a control unit for executing a job process according to a prescribed operation process for the attached removable storage device set in the electrically connected state with said corresponding connector;

an operation history management unit for managing history information of a user's operation process executed for the attached removable storage device set in the electrically connected state with said corresponding connector; and an authentication unit for executing a personal authentication process, wherein when the personal authentication process in said authentication unit is ended, said connection management unit sets the electrically connected state between said attached removable storage device and said corresponding connector to the not-connected state, based on whether or not there exists history information of the user's operation process executed for the attached removable storage device set in the electrically connected state with said corresponding connector as managed by said operation history management unit.

10. The information processing apparatus according to claim 9, wherein when the personal authentication process in said authentication unit is ended, if there exists history information of the user's operation process executed for the attached removable storage device set in the electrically connected state with said corresponding connector as managed by said operation history management unit, said connection management unit determines whether or not a prescribed condition is satisfied based on content of said history information of the user's operation process and sets the electrically connected state between said attached removable storage device and said corresponding connector to the not-connected state based on a result of the determination.

11. The information processing apparatus according to claim 10, wherein said connection management unit determines, as said prescribed condition, whether or not history only having an operation process of selecting the attached removable storage device and an operation process of ending said selecting the attached removable storage device is included in said history information of the user's operation process.

12. The information processing apparatus according to claim 11, wherein said connection management unit determines, as said prescribed condition, whether or not history having, as an operation procedure, an operation process of selecting the attached removable storage device, an operation process of ending said selecting the attached removable storage device, an operation process of selecting another attached removable storage device, an operation process of selecting a file stored in said another removable storage device, and an operation process of reading data from the selected file is included in said history information of the user's operation process.

13. A method of controlling an information processing apparatus provided with a plurality of connectors to each of which a removable storage device can be attached, said method comprising the steps of:

setting an electrically connected state between the attached removable storage device and a corresponding connector among said plurality of connectors;

executing a job process for the attached removable storage device set in the electrically connected state with said corresponding connector;

managing history information of the job process executed for the attached removable storage device set in the electrically connected state with said corresponding connector;

determining whether or not a personal authentication process is ended after the personal authentication process is executed; and when it is determined that said personal authentication process is ended, setting the electrically connected state between said attached removable storage device and said corresponding connector to a not-connected state, based on whether or not there exists history information of the job process executed for the attached removable storage device set in the electrically connected state with said corresponding connector.

14. A method of controlling an information processing apparatus provided with a plurality of connectors to each of which a removable storage device can be attached, said method comprising the steps of:

setting an electrically connected state between the attached removable storage device and a corresponding connector among said plurality of connectors;

executing a job process according to a prescribed operation process for the attached removable storage device set in the electrically connected state with said corresponding connector;

managing history information of a user's operation process executed for the attached removable storage device set in the electrically connected state with said corresponding connector;

determining whether or not a personal authentication process is ended after the personal authentication process is executed; and when it is determined that said personal authentication process is ended, setting the electrically connected state between said attached removable storage device and said corresponding connector to a not-connected state, based on whether or not there exists history information of the user's operation process executed for the attached removable storage device set in the electrically connected state with said corresponding connector.

* * * * *